United States Patent

Mayer

[15] 3,685,602

[45] Aug. 22, 1972

[54] AUTOMATIC BATCH WEIGHER

[72] Inventor: Gerald C. Mayer, 5 Cedar Place, Wayne, N.J. 07470

[22] Filed: May 28, 1971

[21] Appl. No.: 148,227

Related U.S. Application Data

[60] Continuation of Ser. No. 840,097, June 10, 1969, abandoned, which is a division of Ser. No. 658,229, Aug. 3, 1967, Pat. 3,528,518.

[52] U.S. Cl. .................................... 177/70, 177/210
[51] Int. Cl. ............................................ G01g 19/22
[58] Field of Search ....... 177/46, 50, 70, 80, 105, 210

[56] References Cited

UNITED STATES PATENTS

| | | | |
|---|---|---|---|
| 3,101,801 | 8/1963 | Miller | 177/70 |
| 3,104,727 | 9/1963 | Chilton | 177/70 |
| 3,106,974 | 10/1963 | Williams, Jr. | 177/70 |
| 3,204,711 | 9/1965 | Boadle et al. | 177/70 |
| 3,217,927 | 11/1965 | Bale, Jr. et al. | 177/70 X |
| 3,221,828 | 12/1965 | Kohler | 177/70 |
| 3,477,529 | 11/1969 | Burn et al. | 177/50 |

*Primary Examiner*—Stephen J. Tomsky
*Assistant Examiner*—George H. Miller, Jr.
*Attorney*—Norris & Bateman

[57] ABSTRACT

The batch weighing system disclosed herein for successively weighing out pre-selected ingredients in a batch formula has a modularized weight controller circuit in which pre-set voltages control the weights of ingredients or materials making up the batch and in which a skeleton network is selectively built up by using logic card modules to provide selected combinations of the following functions: automatic, compensated cutoff of each ingredient delivered to the scale hopper, delivery of each ingredient to the scale hopper at a full flow feed rate and a dribble feed rate, overweight and underweight checking of each delivered ingredient, partial batch control for delivering only a selected percentage of each ingredient to reduce the total weight of the batch while retaining the proper proportions of the ingredients in a given formula, an automatic tare to facilitate the use of non-accumulative weight selection devices, and a maximum batch size control to provide an indication if the scale capacity is exceeded.

19 Claims, 8 Drawing Figures

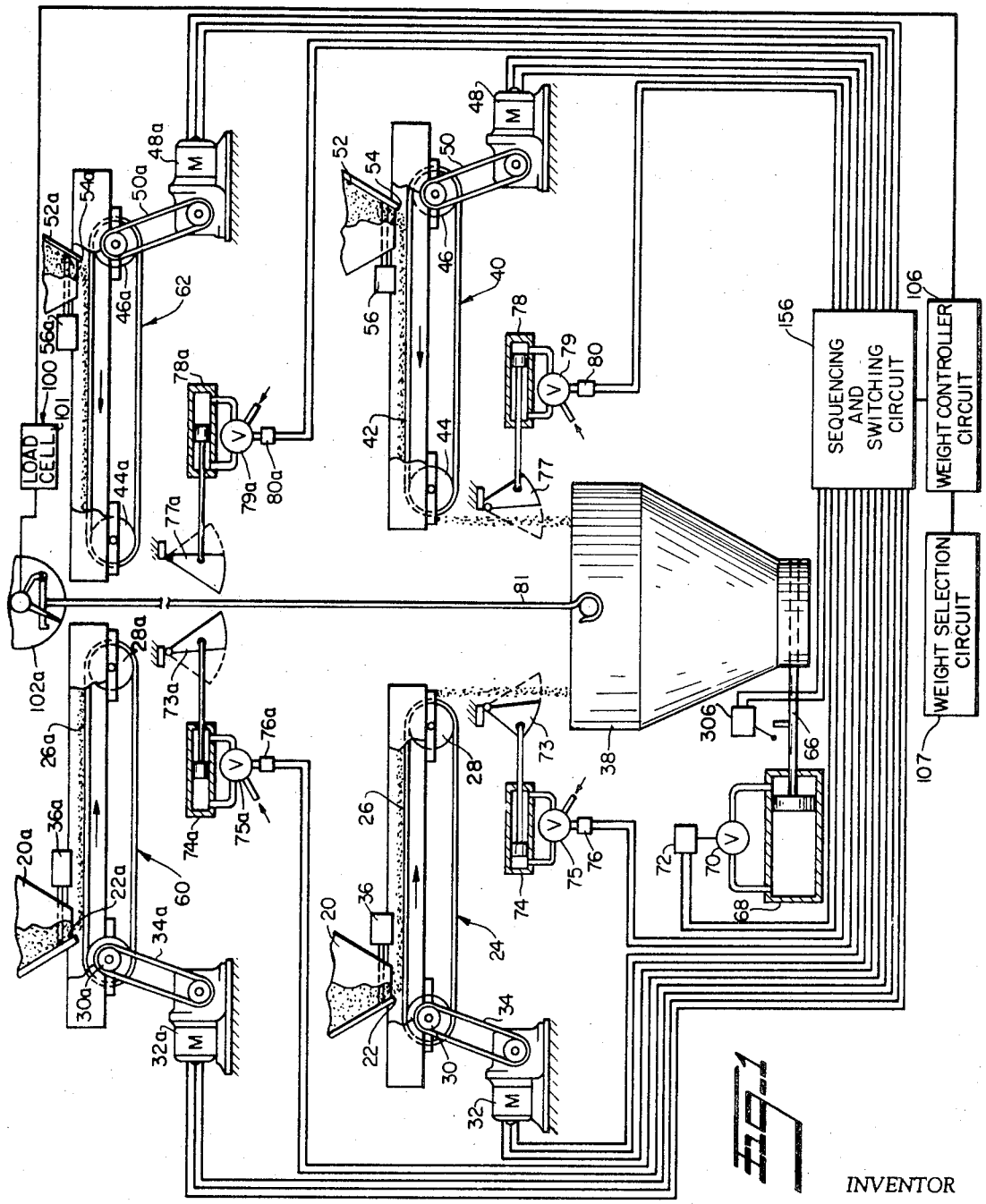

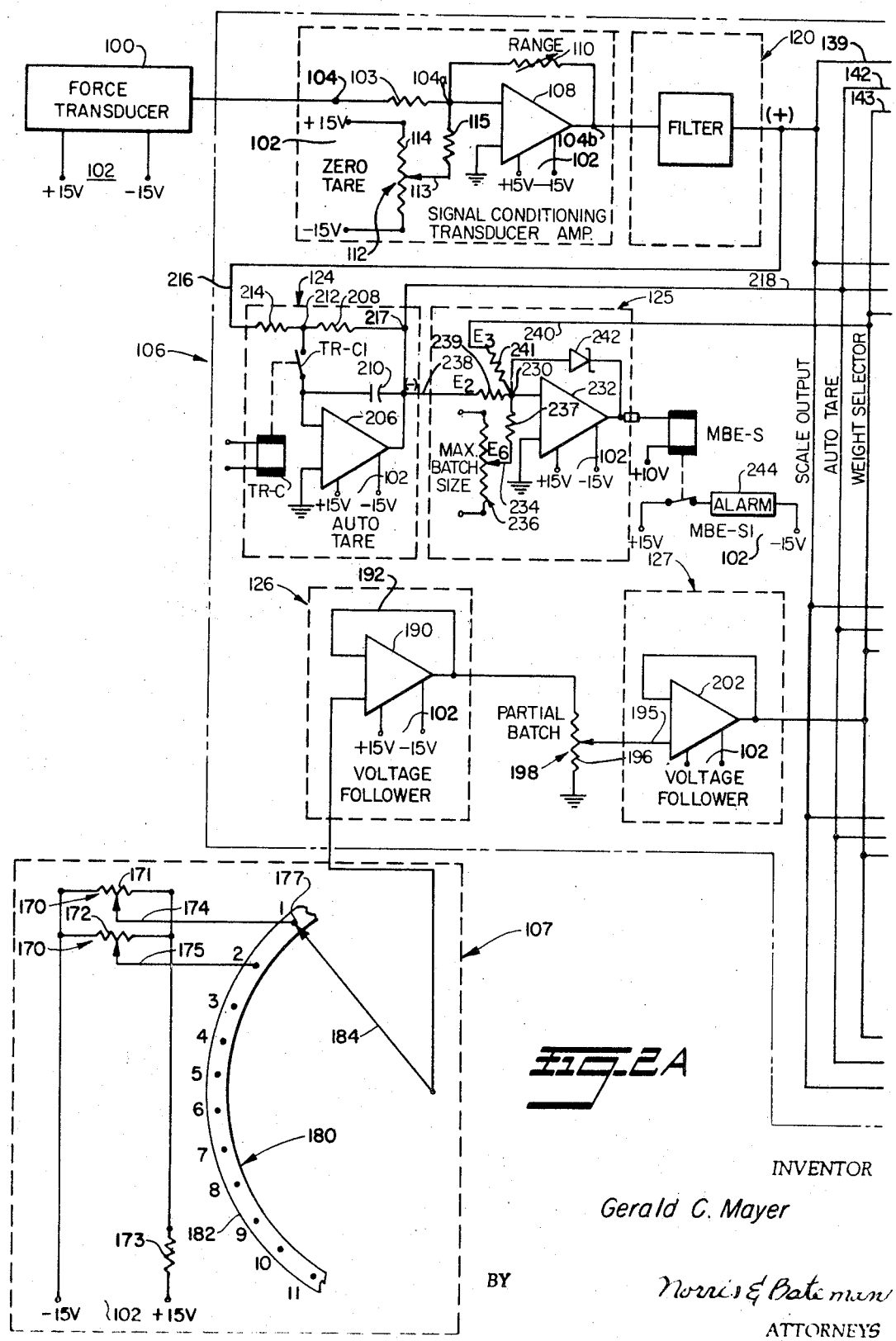

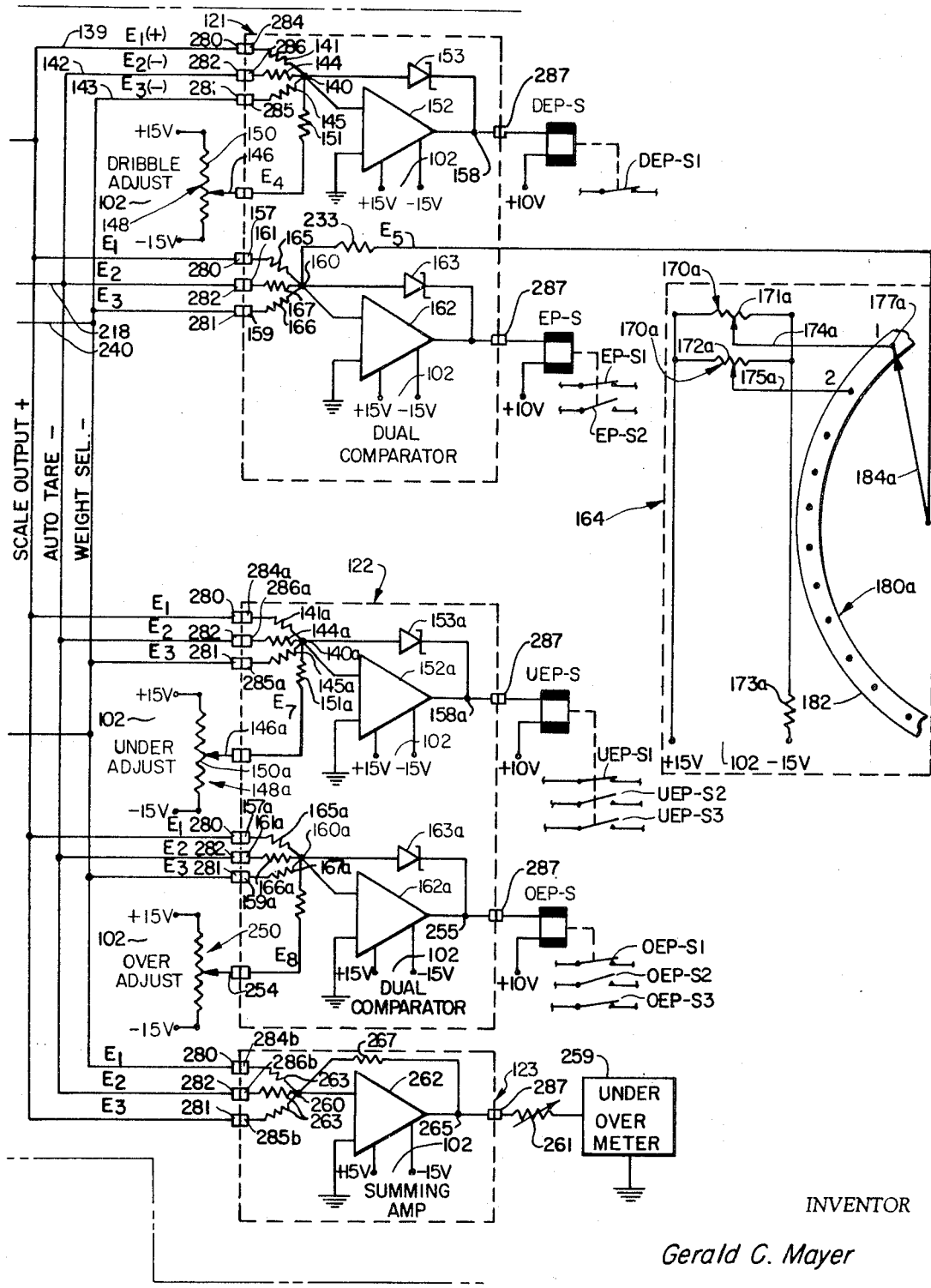

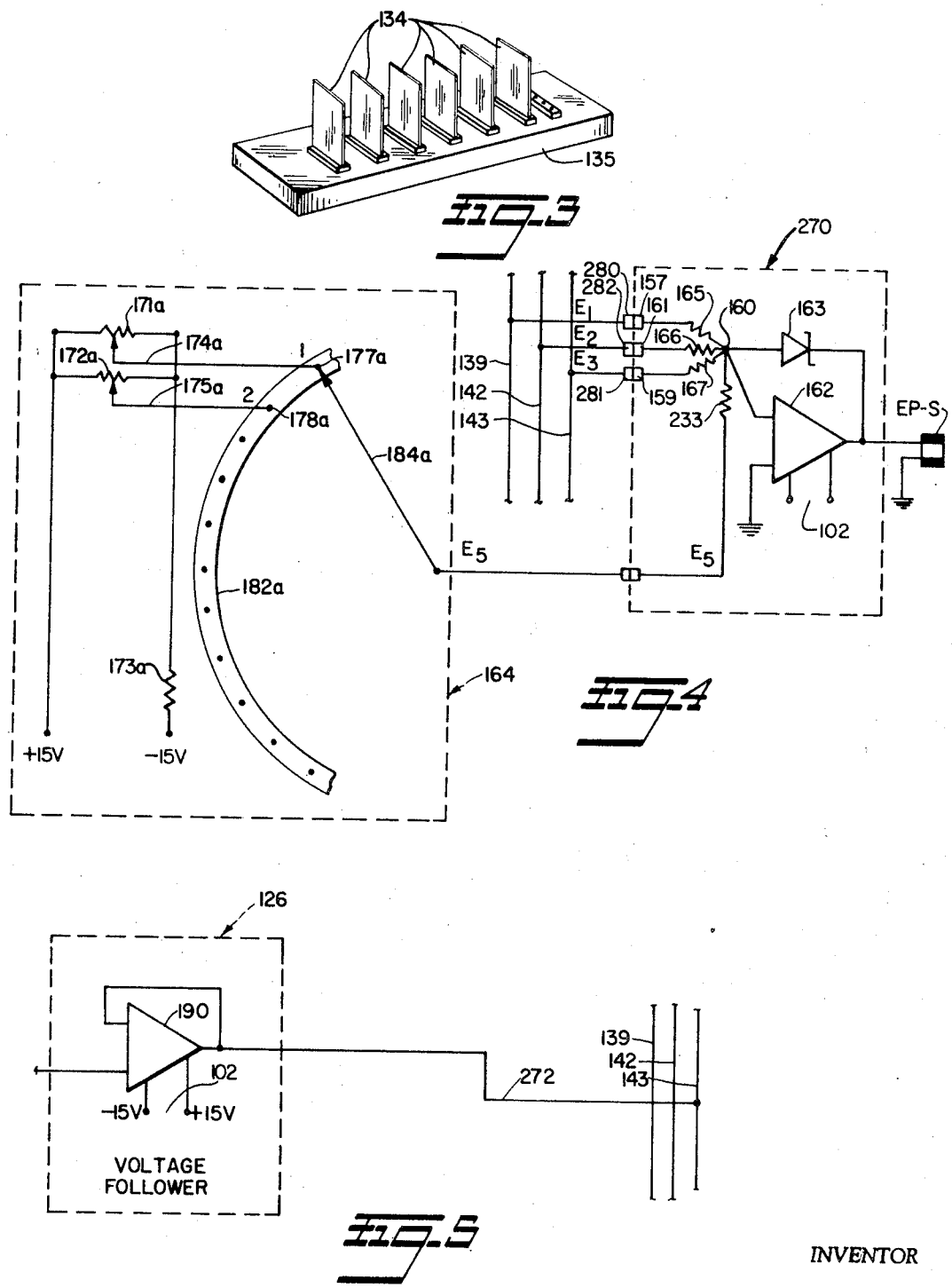

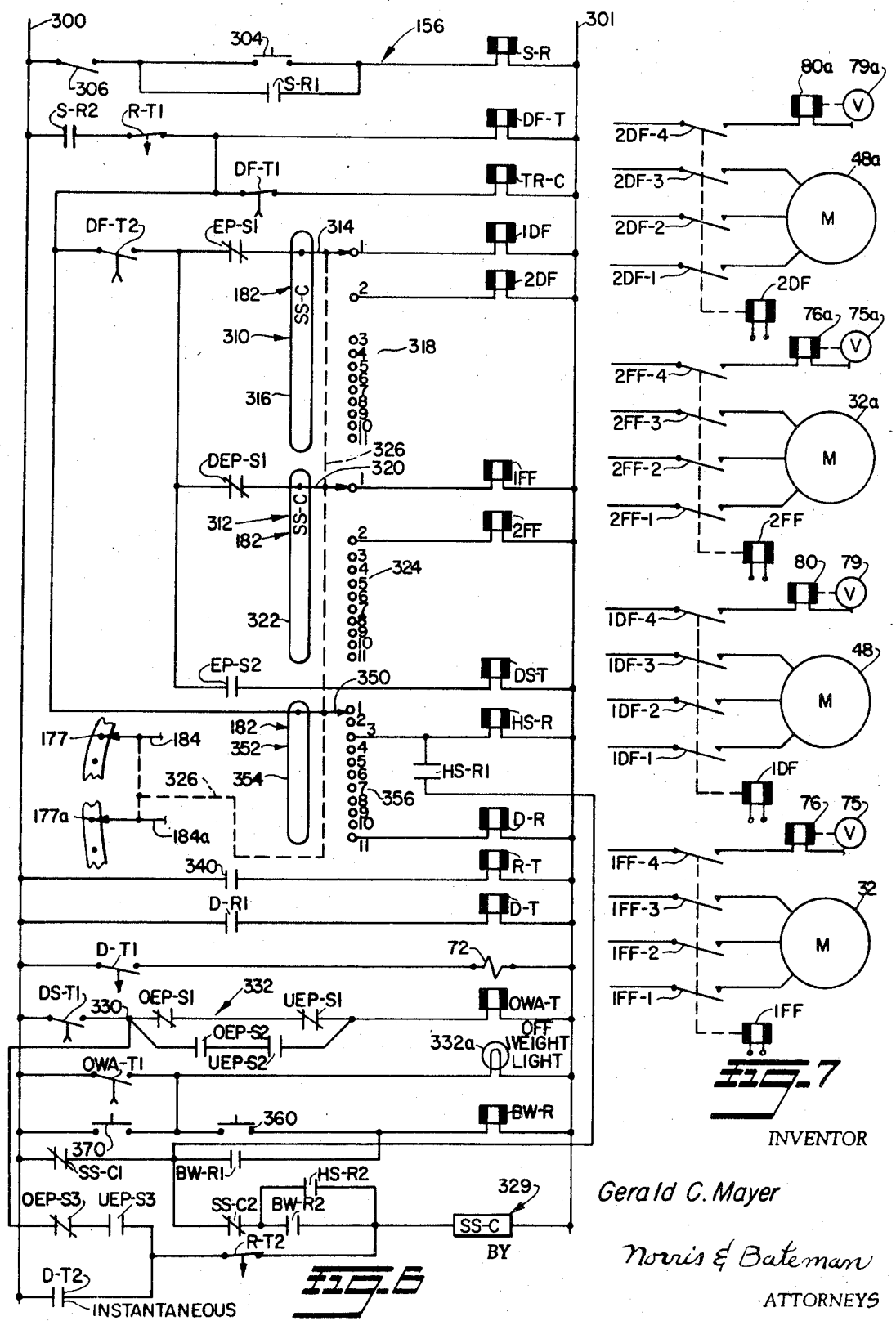

AUTOMATIC BATCH WEIGHER

This application is a continuation of application Ser. No. 840,097, filed on June 10, 1969 for Automatic Batch Weigher, now abandoned, said application Ser. No. 840,097 being a division of application Ser. No. 658,229 filed on Aug. 3, 1967 for Automatic Batch Weigher, now U.S. Pat. No. 3,528,518.

FIELD OF INVENTION

This invention relates to electrical control equipment wherein a measurable condition is sensed and compared with a reference signal to provide a control signal representative of the deviation between the sensed condition and the reference signal. The present invention is particularly concerned with the incorporation of such equipment into batch weighing systems wherein pre-set voltage circuits control the weights of different materials making up a batch formula.

BACKGROUND

Conventional automatic batch weighing systems, such as that described in U.S. Letters Pat. No. 3,173,504 issued to M. T. Thorsson et al. on Mar. 16, 1965, typically comprise a transducer for producing a signal representing the weight of material delivered to a weighing hopper, a pre-set weight selection device for producing separate reference signals respectively representing the pre-selected weights of a plurality of materials to be successively delivered to the weighing hopper, a control circuit for comparing the weight selection signal with the transducer signal to control the amount of each material delivered to the hopper, and a programmer for automatically delivering the materials in succession and for sequentially switching in the corresponding weight selection reference signals.

The electrical circuitry employed prior to this invention for the foregoing type of batch weight control is relatively complex, contains a considerable number of electrical components, and requires a great deal of hand wiring as evidenced from U.S. Pat. No. 3,173,504 mentioned above. Manufacture of such a control circuitry is therefore costly and time-consuming. These prior control circuits furthermore are relatively inflexible in that the removal or addition of many of the functions performed by the circuit adversely affects the performance of the remaining circuitry. Consequently, the addition or removal of such control circuit functions is attainable only by making major revisions in the circuitry.

Integrated and modularized circuits offer significant advantages which if properly adapted can avoid the shortcomings mentioned above. However, it will readily be appreciated that many circuits are not adapted for modularization and integration owing to their logic and the form of the electrical components in the circuit.

Modularization of a circuit and the placement of the modules on logic cards, which are adapted to be plugged into a motherboard, therefore depend upon a number of factors including the logic of the circuit and the components which are employed to make up each module. Logic, as used in the foregoing sense, involves the relationship of the modules to each other, to other unmodularized portions of the circuit, and to external circuits which are electrically connected to the modularized circuit.

Prior to this invention, no suitable logic has been devised to modularize a major portion of a batch weight control circuit, especially when various, interrelated refinements are involved such as dribble feed control, compensated final cutoff control, overweight and underweight checking, automatic taring, partial batch control, and maximum size batch control.

OBJECTS AND SUMMARY OF INVENTION

It therefore is a major object of this invention to provide a novel modularized control circuit which is especially adapted for use in a batch weighing system.

For batch weight control two basic signals are delivered to the control circuit of this invention. One is the scale output signal which is developed by a transducer and which represents the weight of material delivered to the scale hopper. The other is the weight selection signal which is developed by a weight selection device and which represents the desired or pre-selected amount of material to be delivered. The control circuit compares these signals to produce an output error signal which is operative upon reaching a predetermined value to perform a certain function, such as cutting off the delivery of the material to the weighing hopper.

These scale output and weight selection signals are delivered to separate input terminal connections in the control circuit. Each input terminal connection, according to one aspect of this invention, is connected by parallel current paths to a plurality of separate terminals which may be in the form of sockets in a motherboard. The socket or motherboard terminals are arranged in pairs, one for delivering the scale output signal and the other for delivering the weight selection signal.

The modules, which develop the output signals of the control circuit are on separate logic cards, which are adapted to be plugged into the motherboard for connection to one or more of the socket terminal pairs mentioned above. Thus each module receives the scale output and weight selection signals independently of any of the other modules which develop the output signals of the control circuit. Their insertion into or removal from the control circuit therefore does not affect the performance of the other parts of the circuit.

Accordingly, the control circuit of this invention provides for the selective addition or subtraction of functions simply by plugging in or unplugging the logic cards. The circuit may be built up with logic card modules to independently and optionally perform any one or combination of functions including dribble feed rate control, compensated final cutoff control, overweight checking and underweight checking.

With dribble feed rate control, the feed rate of material being delivered to the weighing hopper is automatically reduced to a dribble flow rate as a balanced scale condition is approached to minimize weighing errors. One card may be used to provide the dribble feed and to control the final cutoff of the material when a balanced scale condition is reached. Under such circumstances, the dribble feed control may be omitted simply by replacing the logic card module with one having only the final cutoff control.

The control circuit of this invention also can be used in conjunction with non-accumulative weight selection devices and accumulative weight selection devices. In the former, the pre-set voltage signals are respectively proportional to the weights of the ingredients. For example, if it is desired to deliver 80 pounds of a first ingredient and 60 pounds of a second ingredient, the voltage signals developed by a non-accumulative weight selection device and sequentially delivered to the control circuit will each be proportional to their associated ingredients such as 8 volts for the first ingredient and 6 volts for the second ingredient. In comparison, the voltage signals developed by an accumulative weight selection device for the same weights will be 8 volts for the first ingredient and 14 volts for the second ingredient.

When a non-accumulative weight selection device is used, it is necessary to tare the scale output by effectively cancelling out the transducer scale output signal before each succeeding ingredient is delivered. The logic of the control circuit of this invention is such that an auto-tare logic card module may be plugged in or unplugged without adversely affecting other parts of the circuitry that would be used in conjunction with an accumulative weight selection device.

In conjunction with the non-accumulative weight selection device, a maximum batch control card module may optionally be incorporated to provide an indication if the pre-set weight of each ingredient to be delivered to the weighing hopper exceeds the scale capacity or results in what is termed as "an impossible batch."

In addition to the foregoing, a partial batch control is readily added to or removed from the control circuit with no significant change in circuitry.

Thus the present invention contemplates and has as a further object a novel, versatile batch weigher control circuit in which various functions can be added or subtracted without affecting the overall performance of the system.

Another more specific object of this invention is to provide a novel modularized batch weight control circuit which can be built up with logic cards to perform selected combinations of the following functions: automatic, compensated final cutoff of material feed to the weight hopper, automatic dribble feed control of the material being delivered, underweight checking, overweight checking, automatic taring to facilitate the use of non-accumulative weight selection devices, maximum batch control, and partial batch control.

Still another object of this invention is to provide a novel auto-tare circuit which is simple and inexpensive.

A further object of this invention is to provide a novel auto-tare and maximum size batch control combination wherein a signal developed by the auto-tare circuitry is applied with the weight selection signal and a control signal to provide an indication if the selected amount of ingredient to be delivered exceeds the scale capacity.

Another object of this invention is to provide novel, simplified partial batch control circuit which enables an operator to selectively reduce the size of the batch while retaining the proper proportions of the ingredients making up the batch formula.

Further objects of this invention will appear as the description proceeds in connection with the appended claims and annexed drawings wherein:

FIG. 1 is a generally diagrammatic view illustrating an automatic batch weighing apparatus constructed according to a preferred embodiment of this invention;

FIGS. 2A and 2B diagrammatically illustrate the weight controller circuit shown in FIG. 1;

FIG. 3 is a partially schematic view illustrating the logic card and motherboard arrangement for the modules shown in FIG. 2;

FIG. 4 illustrates the weight control circuit modification for eliminating the dribble feed control shown in FIG. 2;

FIG. 5 illustrates the weight control circuit modification for eliminating the partial batch control shown in FIG. 2;

FIG. 6 is a diagram of the sequencing and switching circuit illustrated in FIG. 1, and FIG. 7 is a diagram of the energizing circuits for the material feed motors shown in FIG. 1.

BATCH WEIGHING APPARATUS

Referring now to the drawings wherein the same reference numerals designate like parts throughout, the weighing apparatus of this invention shown in FIG. 1 comprises a hopper 20 having an open bottom 22 for discharging a first fluent or particulate material in a layer upon an endless belt, power driven feeder 24 of conventional construction. Feeder 24 has an upper belt flight 26 which is horizontal and which moves from left to right in FIG. 1 between pulleys 28 and 30. An electric motor 32 connected to pulley 30 by an endless chain 34 drives pulleys 28 and 30 at the same constant speed. A manually operated discharge gate 36 is provided to control delivery of material from hopper 20 to feeder 24. The material passing through the open bottom 22 of hopper 20 is advanced in a layer on the upper belt flight 26 of feeder 24. This material falls off the end of the flight as it passes around pulley 28 and descends in a freely falling continuous column directly into a weight hopper 38. In this embodiment, feeder 24 is employed to deliver material to hopper 38 at a full flow rate and a separate feeder 40 is used to deliver a dribble feed to the weight hopper.

Feeder 40 preferably is of the same construction as feeder 24 and has a conveyor belt comprising an upper flight 42 which moves horizontally from right to left in FIG. 1 between two pulleys 44 and 46. Pulleys 44 and 46 are driven at the same constant speed by an electric motor 48 which is connected to pulley 46 by an endless chain drive 50. A fixed hopper 52 having an open bottom 54 positioned over feeder 40 discharges material by gravity onto belt flight 42. Hopper 52 is provided with a conventional manual operated discharge gate 56 for controlling delivery of material to feeder 40.

With continued reference to FIG. 1, the material discharged by hopper 52 and advanced by belt flight 42 to the end of feeder 40 above weight hopper 38 falls off belt flight 42 as it passes around pulley 44 and descends in a freely falling column directly into the hopper.

In the construction shown in FIG. 1, the relative positions of feeders 24 and 40 are only diagrammatically illustrated and, in practice, feeder 40 may be positioned beside feeder 24 to provide a more compact assembly. In such case, it is clear that hopper 52 may be an extension or part of hopper 20.

To deliver a second material to weigh hopper 38, separate full flow and dribble flow feeders 60 and 62 are provided. Feeders 60 and 62 may be of the same construction as feeders 24 and 40 as shown in FIG. 1. Accordingly, the parts of feeders 60 and 62 which are the same as the parts in feeders 24 and 40 have been designated by like reference characters suffixed with the letter a.

While the material feeding apparatus described herein is limited to the delivery of two ingredients to weight hopper 38, it will be appreciated that any number of ingredients may be delivered to hopper 38 by adding further feeding apparatus of the type already described. It also will be appreciated that any other suitable arrangement of feeding may be employed. Also other types of material feeding apparatus may be employed such as, for example, screw conveyors.

As shown in FIG. 1, weight hopper 38 is provided with a discharge gate 66 for controlling the discharge of material through the open bottom of hopper 38 by gravity. Gate 66 is opened and closed by a suitable fluid motor 68. A valve 70 actuated by a solenoid 72 controls the supply and exhaust of fluid for operating motor 68. When solenoid 72 is energized, motor 68 is operated to open gate 66. Deenergization of solenoid 72 causes gate 66 to close.

With continued reference to FIG. 1, pivotally mounted full flow catch gate 73 is interposed between feeder 24 and hopper 38. Gate 73 is swung about its pivot axis between its full line and dotted line positions to respectively permit and interrupt delivery of material from feeder 24 by a suitable fluid motor 74. A valve 75 actuated by a solenoid 76 controls the supply and exhaust of fluid for operating motor 74. When solenoid 76 is energized, motor 74 is actuated to cause gate 73 to open permitting feeder 24 to deliver material to hopper 38.

As shown in FIG. 1, a further pivotable catch gate 77 is interposed between feeder 40 and hopper 38. Gate 77 is swung between its full line and dotted line positions by a suitable fluid motor 78 to permit and interrupt delivery of material from feeder 40. A valve 79 actuated by a solenoid 80 controls the supply and exhaust of fluid for operating motor 78. When solenoid 80 is energized, motor 78 is actuated to cause gate 77 to open permitting feeder 40 to deliver material to hopper 38.

Feeders 60 and 62, as shown in FIG. 1, are also provided with catch gates and fluid motor operators of the same construction as just described for feeders 24 and 40. Accordingly, the catch gate structure for feeders 60 and 62 have been identified with like reference numerals suffixed with the letter a as shown.

A force transducer 100, which is operatively connected to the weighing apparatus, may be of any suitable form, such as a load cell or a potentiometer device, for sensing the weight of material delivered to hopper 38 and for converting the sensed weight into an analogue, D. C. voltage signal.

In this embodiment, transducer 100 is shown to comprise at least one load cell 101 operatively connected to hopper 38. The load cell may be of the conventional silicon or resistance gauge type and is excited from a suitable D. C. supply source 102. For a silicon gauge load cell, the excitation source may be ± 15 volts as shown to provide a full scale output of 1 volt for 30 volts excitation. Load cell 101, of course, may be connected to any suitable operative scale part which moves in proportion to the weight of delivered material such as, for example, a fulcrumed weight beam (not shown) connected to hopper 38 or the dial shaft in a standard dial head scale 102a. Such a scale dial head is described in U. S. Letters Pat. No. 3,254,728 bearing the issue date of June 7, 1966.

WEIGHT CONTROLLER CIRCUIT

Referring now to FIG. 2A, the output of transducer 100 is applied to a terminal 104 of a summing resistor 103 in a weight controller circuit 106. Circuit 106, as will be explained in detail shortly, is, among other things, operative to electrically compare the voltage output signal of transducer 100 with successively impressed, pre-set reference voltage signals each representing the desired weight of a material which is to be delivered to hopper 38. This comparison is employed to develop control signals for controlling the amount of each material delivered to hopper 38 and also for providing other functions including overweight, underweight, and acceptable weight indications in a checkweighing operation. The pre-set reference voltage signals are provided by a weight selection circuit 107 which will be described in detail later on.

As shown in FIG. 2A, the transducer output signal applied to terminal 104 is coupled through resistor 103 to a junction 104a which is connected to an input channel of a signal conditioning, operational amplifier 108. A variable feedback resistor 110 couples the output voltage signal of amplifier 108 back to junction 104a to provide for an adjustment of the voltage range impressed upon circuit 106. Operating power for amplifier 108 is derived from source 102.

A zero tare adjustment is provided by a potentiometer 112 having an arm 113 which is adjustable along a resistor 114. Resistor 114, according to one aspect of this invention, is connected across source 102. The voltage impressed on arm 113 is coupled through a summing resistor 115 to junction 104a as shown The force transducer output voltage signal and the zero tare potentiometer voltage signal will be opposite in sign.

Arm 113 is adjusted to offset the weight of scale parts acting on transducer 100 to provide a zero amplifier output voltage signal at junction 104b when hopper 38 is empty.

The values of resistors 103 and 115, which form a summing network, are equal and the value of resistor 110 is adjusted to provide an output voltage at junction 104b which is proportional to the algebraic summation of the voltage signals applied to terminal 104, the voltage signal at junction 104b will therefore be proportional only to the amount of material delivered to the weight hopper.

Where resistors 104, 110, and 115 respectively have values $R_1$, $R_f$, and $R_2$, and where the voltages at terminal 104, arm 113, and junction 104b are respectively represented by $E_i$, $E_T$, and $E_o$, it will be observed that $(E_T/R_2)+(E_i/R_1)$ is substantially equal to $(E_o/R_f)$ The reason for this is that for the illustrated amplifier connections, the maximum voltage at junction 104a will only be a very small and negligible amount greater and less than ground or 0 volts owing to the very high gain and impedance characteristics of operational type amplifiers.

Both transducer 100 and amplifier 108 are suitably located at the scale which comprises hopper 38 and dial head 102a. The remaining components of circuit 106, which will now be described, may be remotely located at a control panel (not shown).

With reference to FIGS. 2A and 2B, the remainder of circuit 106 is formed by series of integrated modularized building blocks comprising a filter module 120, a pair of dual comparator modules 121 and 122, a summing amplifier module 123, an auto-tare module 124, a maximum batch size module 125, and a pair of voltage follower modules 126 and 127. Each of the modules 120-127 is on a printed-circuit logic card 134 (see FIG. 3) which is adapted to be plugged into a motherboard 135 or the like. Modules 120–127 represent a complete control system with all refinements, but as will be seen later on, many of these modules, owing to their unique, interrelated arrangement and connections in the controller circuit, may optionally be removed or added without affecting the overall performance of the weighing system. The network comprising amplifier 108, potentiometer 112, and the associated resistors also may be incorporated into a printed logic card. Any suitable conventional plug-in card and motherboard assembly may be employed for modules 120–127.

As shown in FIG. 2A, the amplified output voltage signal of amplifier 108 is delivered to module 120 which filters out an A. C. component that may have been superimposed on the D. C. signal. The filter of module 120 may be of any suitable form and should be of the low pass type having good frequency and time response characteristics to develop a filter output signal which is substantially free of A. C. components that might interfere with the trouble-free operation of circuit 106.

The filtered and amplified transducer voltage output signal $E_1$ is connected by a conductor 139 from the output of module 120 to an input terminal 284 (FIG. 2B) in module 121. Terminal 238 is connected through a summing resistor 141 to a summing junction 140. Also coupled to function 140 are auto-tare and weight selection voltage signals $E_2$ and $E_3$ which are delivered along conductors 142 and 143 respectively. Conductor 142 is connected to an input terminal 286 in module 121, and terminal 286 is connected through a summing resistor 144 to junction 140. Similarly, conductor 143 is connected to a terminal 285 in module 121, and terminal 285 is connected through a summing resistor 145 to junction 140. The manner in which the auto-tare and weight selection signals are developed will be described shortly.

Also coupled to function 140 is a pre-set dribble feed voltage signal $E_4$ which is developed on the adjustable arm 146 of a potentiometer 148 having a resistor 150 connected across source 102. Arm 146 is connected through a summing resistor 151 to junction 140. Junction 140 is connected to the inverting channel of an operational amplifier 152 in module 121. The non-inverting channel of amplifier 152 is clamped to ground. Operating power for amplifier 152 is derived from source 102.

Amplifier 152, resistors 141, 144, 145, and 151, and a 10 volt zener diode 153 form a voltage comparison circuit whose output signal controls energization of a dribble feed relay DEP-S. Diode 153 has its anode gate and cathode gate respectively connected to junction 140 and the output of amplifier 152 to provide a feedback loop for controlling the gain of the amplifier.

As shown, the cathode gate of diode 153, the output of amplifier 152, and one terminal of the operating coil of relay DEP-S are connected to junction 158. The other terminal of the coil of relay DEP-S is connected to a +10 volt source.

When the algebraic summation of signals $E_1$, $E_2$, $E_3$, and $E_4$ is negative, diode 153 will be reverse biased and will hold the output voltage at junction 158 at 10 volts. This is evident from the fact that for a very small difference between the signal voltages applied to the amplifier inverting and non-inverting input channels or terminals, an operational type amplifier produces its maximum output voltage which is positive or negative depending upon the direction of the difference. This is due to the very high impedance and gain characteristics of operational type amplifiers. Thus, when the algebraic summation of signal voltages $E_1$, $E_2$, $E_3$, and $E_4$ is at least slightly negative amplifier 152 tends to produce a maximum positive voltage since junction 140 is connected to the inverting channel.

The voltage at junction 140, owing to the circuitry of operational amplifiers, will not deviate significantly from zero volts when amplifier 152 is grounded as shown in FIG. 2B, regardless of the deviation of the algebraic summation of signal voltages $E_1$, $E_2$, $E_3$, and $E_4$ from 0 volts. Since the slightest deviation of the algebraic summation of voltages $E_1$, $E_2$, $E_3$, an$E_4$ from zero is negative and since the amplifier output voltage is positive, diode 153 will therefore be reverse biased and will hold the voltage at junction 158 to 10 volts, for, as previously mentioned, it is a 10 volt zener.

When +10 volts is applied at junction 158, there will be no voltage drop across the coil of relay DEP-S. Relay DEP-S will therefore be de-energized. When the algebraic summation of signal voltages $E_1$, $E_2$, $E_3$, and $E_4$ becomes 0, diode 153 becomes forward biased to clamp the voltage at junction 158 to substantially zero volts. As a result, a voltage drop is developed to energize relay DEP-S.

Amplifier 152 is conventional and preferably is of the single swing type shown and described on page 45 of the Burr-Brown Research Corporation Handbook (first edition) entitled "Operational Amplifiers."

Module 121, as shown in FIG. 2B, is provided with a further summing junction 160 and a second operational amplifier 162. Conductors 139, 142, and 143 are respectively connected to terminals 157, 161, and 159 on module 121, and terminals 157, 159, and 161 are respectively connected through summing resistors 165, 166, and 167 to junction 160. The voltage signals $E_1$, $E_2$, and $E_3$ are therefore applied to junction 160 respectively through resistors 165, 167, and 166. A pre-set weight compensating voltage signal $E_5$ by sequencing shift register 164 is also impressed on junction 160. Function 160 is connected to the inverting input terminal of amplifier 162. The non-inverting input terminal of amplifier 162 is clamped to ground. As will be explained in detail later on, voltage signal $E_5$ compensates for the additional material which is fed to the hopper as a result of lags in the system. These lags unavoidably delay cutoff of the material when a balanced scale condition is reached.

Comparator 162 has a feedback loop containing a 10 volt zener diode 163. This comparator circuitry comprising amplifier 162, diode 163, and resistors 165, 166, and 167 is the same as that just described for amplifier 152, diode 153, and resistors 141, 145, and 144. When the algebraic summation of signals $E_1$, $E_2$, $E_3$, and $E_5$ becomes zero, diode 163 is forward biased to provide a voltage drop across the coil of a final cutoff relay EP-S. Relay EP-S will therefore be energized. As will be described fully later on, energization of relay EP-S interrupts the dribble feed signals $E_1$, $E_2$, $E_3$, and $E_5$ is negative, diode 163 is reverse biased to prevent a voltage drop across the coil of relay EP-S. In the circumstances, relay EP-S will be de-energized.

As shown in FIG. 2A, weight selection circuit 107 is shown to comprise a plurality of potentiometers 170 corresponding in number at least to the number of different ingredients to be delivered to hopper 38 in a single batch. In this embodiment, two weight selection potentiometers are shown, but more may be added if needed. The resistors of potentiometers 170 are respectively designated by the reference characters 171 and 172 which are connected in parallel across one terminal of a voltage dropping resistor 173 and the +15 volt terminal of source 102. The other terminal of resistor 173 is connected to the −15 volt terminal of source 102. The value of resistor 173 is so chosen that the voltage at its terminal connected to resistors 71 and 172 is 0. This, as will become apparent shortly, provides signal $E_3$ with a sign which is opposite with respect to the sign of signal $E_1$. Thus, if signal $E_1$ is positive, signal $E_3$ will be negative.

The adjustable potentiometer arms or wipers for resistors 171 and 172 are respectively designated by the reference characters 174 and 175 and are respectively connected to fixed contacts in a bank 177 of a sequencing shift register 180. Register 180 forms a part of a suitable multi-deck stopper switch 182 having a contact arm 184 which is advanceable to successively engage contacts in bank 177.

Potentiometers 170 are pre-set to impress on arms 174 and 175 negative weight selection signal voltages which are respectively proportional to the selected weights of the different ingredients to be delivered to hopper 38 in a batching operation. These weight selection voltage signals are successively transmitted to arm 184 as arm 184 is stepped to successively engage the contacts in bank 177. The weight selection voltage signal delivered to stepper arm 184 is coupled to the input of module 126.

In this embodiment, potentiometers 170 are set to provide non-accumulative weight signals as compared with a cumulative weight selection which is well known in the art. In the latter type of weight selection, the weight of the second ingredient is added to that of the first ingredient to provide a signal or factor which is equal to the sum of the weights of the first and second ingredients to control the cutoff of delivery of the second ingredient. By removing module 124 and resetting potentiometers 170, accumulative weight selection is attained. This mode of weight selection is disadvantageous because weighing errors will have a cumulative effect to upset the proportions of ingredients still to be weighed in a given batch. An example of cumulative weight selection is provided in the aforementioned U.S. Pat. No. 3,254,728.

In contrast to cumulative weight selection, weighing errors attributable to ingredients already weighed in accordance with the pre-set values provided by potentiometers 170 do not affect the proportion of weight of ingredients still to be delivered because of the algebraic summation of the auto-tare signal $E_2$ mainly with signals $E_1$ and $E_2$. As a result, the voltage signal applied to arm 184 is proportional to the desired weight of each ingredient and not to the summation of the desired weight of the material being delivered and the weights of materials already delivered.

In place of the potentiometer form of weight selection disclosed in this embodiment, alternate forms of weight selection devices may be employed such as, for example, formula capsules, patchboards, card readers, digital computer inputs, and analog computer inputs.

Still referring to FIG. 2A, the voltage follower module 126 comprises an operational amplifier 190 with a feedback loop 192 coupling the output voltage back to the input of the amplifier. A suitable voltage follower of this type is shown on page 9 of the previously mentioned Burr-Brown handbook. This voltage follower circuit in essence transfers a high impedance source to a low impedance output. In this connection, weight selection circuit 107 has a relatively high impedance, and the voltage follower is incorporated into controller circuit 106 to reduce the signal impedance being delivered to the comparator modules 121–123. Operating power for amplifier 190 is derived from source 102 as shown, and the gain of amplifier 190 will be positive. This output voltage signal is connected to a partial batch control potentiometer 198. The resistor 196 of potentiometer 198 is connected between ground and the signal output terminal of amplifier 190. The arm 195 of potentiometer 198 is connected to the input terminal of a further voltage follower amplifier 202 in module 127.

When arm 195 is moved to a position where no part of the potentiometer resistance is connected in series between the output of amplifier 190 and the input of amplifier 202, 100 percent of the voltage signal developed at the output of amplifier 190 will be impressed on the input of amplifier 202. As arm 195 is moved down toward the potentiometer terminal that is connected to ground, the percentage of the voltage output signal impressed on arm 195 and thus coupled into amplifier 202 will reduce in accordance with the ratio of the resistance value between arm 195 and ground and the total resistance of the potentiometer. In this manner, the weight selection settings of potentiometers 170 can be modified to deliver to hopper 38 a properly proportioned percentage of the ingredients making up the batch to be weighed out simply by adjusting arm 195. In addition, the partial batch potentiometer can be employed to vary only the weights of selected ingredients if desired.

The voltage follower module 127 advantageously is of the same form as module 126 and is desired owing to the relatively high impedance source created by potentiometer 198. The output of module 127 is connected to conductor 143 to couple the weight selection voltage signal $E_3$, which is developed by circuit 107, to junctions 140 and 160 as previously described. Since arm 184 is connected to the non-inverting input terminal of amplifier 190 and since the output of amplifier 190 is connected to the non-inverting input terminal of amplifier 202, the output signal $E_3$ will be negative.

As shown in FIG. 2A, the auto-tare module 124 is a sample or track and hold network comprising an operational amplifier 206, a unity gain feedback resistor 208, and a storage capacitor 210. Capacitor 210 is connected between the input and output channels of amplifier 206 in parallel with resistor 208 when a set of normally open contacts TR-C1 are closed. Terminal 212 of resistor 208 is connected to an input resistor 214. Terminal 212 also is connected through contacts TR-C1 to one plate of capacitor 210 and to the input channel of amplifier 206. This circuitry is conventional as shown on page 99, FIG. 2.75, of Philbrick Researches, Inc., Handbook (second edition) entitled "Applications Manual for Computing Amplifiers for Modelling Measuring Manipulating and Much Else."

According to one aspect of this invention, the output of filter module 120 is connected to one terminal of resistor 214 by a conductor 216. The opposite terminal of resistor 214, as previously mentioned, is connected to terminal 212 of resistor 208. The output of amplifier 206, the other terminal 217 of resistor 208, and the corresponding plate of capacitor 210, which is connected to terminal 217, are all connected to conductor 142 by a branch conductor 218. The voltage signal $E_2$ developed by auto-tare module 124 therefore is transmitted to junction 140 along a current path which is in parallel with the voltage output from module 120.

The function of the track and hold auto-tare module 124 is to provide voltage signal $E_2$ with such a value that it effectively cancels out voltage signal $E_1$ when the delivery of each material is started. At the beginning of each feed cycle, therefore, the unbalanced weight selection voltage signal $E_3$ is impressed upon the comparator circuits in module 121 for developing a negative algebraic summation.

When contacts TR-C1 are closed by energizing a relay TR-C, the amplified and filtered transducer output voltage signal $E_1$ is applied to terminals 284 and 157 without uncoupling the connection of module 120 to terminals 286 and 161. Since closing of contacts TR-C1 couples resistor 208 back to the input of amplifier 206, the amplifier gain will be unity. The output of amplifier 206 will thus be equal in magnitude but opposite in sign to the amplified and filtered transducer output voltage signal $E_1$. When contacts TR-C1 are closed, capacitor 210 will continually be charged up to thus "-track" the output voltage signal of module 120 and consequently memorize the voltage signal being delivered to module 124.

Upon opening contacts TR-C1, capacitor 210 will produce a voltage to the input of amplifier 206 which is equal to that last encountered before the contacts opened. Before each ingredient is delivered to hopper 38 in accordance with the weight settings provided by weight selection circuit 107, contacts TR-C1 are closed to track and memorize the transducer output voltage signal $E_1$ and then are opened to hold the tracked signal. Operation of contacts TR-C1 is controlled by sequencing and switching circuit 156 in a manner which will be described in detail later on.

Considering the operation of the circuit thus far described, assume, as an example, that a residue having a weight equivalent to 1 volt at module 121 is in hopper 38, that the weight of a first ingredient which is pre-set by arm 174, is equivalent to 8 volts, and that the weight of a second ingredient, which is pre-set by arm 175, is equivalent to 6 volts.

Before delivery of the first ingredient is initiated by starting feeder 24, circuit 156 is operated to energize relay TR-C. Contacts TR-C1 will therefore close to allow capacitor 210 to be charged. After sufficient time is allowed for charging capacitor 210 up to the input voltage (1 volt), relay TR-C is de-energized to open contacts TR-C1 before feeder 24 is started.

Stepper arm 184 will be in engagement with the first contact in bank 177 and the partial batch potentiometer arm 195 will be at its maximum position for coupling 100 percent of the voltage signal from module 126 to module 127. Therefore, signal $E_1$ will be equal to 1 volt, signal $E_2$ will be equal to −1 volt, and signal $E_3$ will be equal to −8 volts.

At some time before the full amount of the first ingredient is delivered to hopper 38, the control circuitry is capable of reducing the flow rate from the full feed flow provided by feeder 24 to a dribble feed, the latter being provided by feeder 40. The transfer point from full feed to dribble feed is controlled by selectively adjusting arm 146 to some value such as +2 volts. For the circuitry in this embodiment, signals $E_3$ and $E_4$ are required to have opposite signs.

At the moment the feeding cycle is initiated by starting feeder 24, voltage signals $E_1$, $E_2$, $E_3$, and $E_4$ will be equal to +1 volt, −1 volt, −8 volts, and +2 volts respectively. Signals $E_1$ and $E_2$ cancel each other out to effectively tare the scale and thereby eliminate any weighing errors attributable to the residue remaining in hopper 38. This leaves signals $E_3$ and $E_4$ which produce, at the start of the feeding cycle, a deviation of −6 volts. Relay DEP-S is therefore de-energized, and circuit 156 is operated to actuate feeders 24 and 40 in a manner to be described in detail later on.

As material enters hopper 38 from feeder 24, the transducer voltage signal $E_1$ increases, but the remaining signals $E_2$, $E_3$, and $E_4$ remain constant. The change in amplitude of signal $E_1$ (i.e., $\Delta E_1$) will therefore reduce the algebraic summation of signals $E_1$, $E_2$, $E_3$, and $E_4$. When this summation is reduced to 0 volts, relay DEP-S will become energized in the manner described previously. Circuit 156, as will be described in detail later on, responds to the energization of relay DEP-S to stop feeder 24. Operation of feeder 40 will continue, thus commencing the dribble feed cycle.

A weight of the first ingredient equivalent to 6 volts has now been delivered to hopper 38. This leaves a weight equivalent to 2 volts to be delivered by the dribble feeder 40.

Sequencing shift register 164, which develops voltage signal $E_5$, may be of the same form as circuit 107. Accordingly, like reference numerals suffixed by the letter $a$ have been applied to designate like elements.

Stepper arm 184a is ganged to arm 184 so that both arms are advanced concomitantly to engage corresponding contacts in their respective contact banks.

Thus when arm 184 engages the first contact in bank 177, arm 184a engages the first contact in bank 177a. Potentiometer arms 174a and 175a are pre-set to control cutoff of the dribble feed of the first and second ingredients to be delivered in a given batch.

Arm 174a is set to develop a voltage signal which will provide for a desired amount of compensation and which will be opposite in sign with respect to voltage signal $E_3$. This voltage signal, which is signal $E_5$, and which for this example may be +1 volt, is coupled through a summing resistor 233 to junction 160 so that when the dribble feeder 40 is started signals $E_1$, $E_2$, $E_3$, and $E_5$ will respectively be +7 volts (1 volt representing the residue plus 6 volts representing the amount of the first ingredient delivered by feeder 24), −1 volt (owing to the stored charge on capacitor 210), −8 volts, and +1 volts. The algebraic summation of these signals will therefore equal −1 volt, and diode 163 will be reverse biased. As a result, relay EP-S will be de-energized which is the condition required to maintain operation of feeder 40.

As material is delivered by feeder 40, the algebraic summation of signals $E_1$, $E_2$, $E_3$, and $E_5$ reduces and when it becomes 0, diode 163 becomes forward biased to cause energization of relay EP-S. This will occur when the scale output signal $E_1$ reaches 8 volts, which amounts to 1 volt of residue and 7 volts of the first material delivered by the operation of feeders 24 and 40. Circuit 156 responds to energization of relay EP-S to close gate 77 and to stop motor 48.

Owing to the unavoidable time delay involved in swinging catch gate 77 to its material interrupting position and in stopping feeder 40 after relay EP-S is energized, an additional amount of material will be delivered to hopper 38 before actual cutoff occurs. This additional amount of material is pre-determined by checking operation of the weighing apparatus before actual usage and in this example is a weight equivalent to 1 volt as applied at terminal 157 Potentiometer arm 174a, having been set for this amount, therefore delivers a voltage signal of +1 volt to compensate for the additional material entering hopper 38 after relay EP-S is energized.

The final amount of material delivered to hopper 38 will therefore be equivalent to the selected 8 volts, and the transducer output voltage signal $E_1$ applied to conductor 139 will therefore rise to +9 volts. The compensation values for the ingredients making up the batch may be set at different values depending upon various factors such as the density of the ingredients.

If no compensation were provided for, it will be appreciated that an additional amount of material in excess of the desired or selected weight will be fed to hopper 38 owing to the inherent electrical and mechanical lags in the weighing system.

Circuit 156 next re-energizes relay TR-C to again close contacts TR-C1 for charging capacitor 210 up to the level of signal $E_1$ which is now at 9 volts. Before feeder 60 is started for delivering the second ingredient to hopper 38, relay TR-C is de-energized and the stored capacitor charge is impressed on the two comparator circuits in module 121 to effectively cancel out signal $E_1$ in the manner previously described.

When stepper arm 184 is now advanced to the second contact in bank 177, an unbalanced voltage signal ($E_3$) of −6 volts is applied to the two comparator circuits in module 121. Circuit 156 is operated by this condition to start feeders 60 and 62 for delivering the second ingredient to hopper 38 at a full flow feed rate.

With voltage signal $E_4$ set at +2 volts, the algebraic summation of the applied signals will be reduced to 0 when voltage signal $E_1$ reaches a level of +13 volts. Operation of feeder 60 will consequently be stopped and operation of the dribble feeder 62 will continue.

When stepper arm 184 was advanced to the second contact in bank 177, arm 184a also was advanced to the second contact bank 177a. The dribble feed is thus carried out and when the algebraic summation of the impressed voltage signals $E_1$, $E_2$, $E_3$, and $E_5$ reduces to 0, circuit 156 is operated to cutoff the flow of material and to stop motor 48a. The foregoing cycle is repeated for as many ingredients which were selected to make up the formula.

In this embodiment, the values of resistors 141, 144, 145, and 151 are equal. Likewise, the values of resistors 165, 166, 167, and 233 are also equal.

If the operator desires only a certain percentage of either the first ingredient or the second ingredient, he simply adjusts the potentiometer arm 195 to reduce the magnitude of voltage signal $E_3$. If in the example just given arm 195 is adjusted to the midpoint of resistor 196, voltage signal $E_3$ will be reduced from 8 to 4 volts for the first ingredient and from 6 volts to 3 volts for the second ingredient.

The maximum batch size module 125 is operative to provide an alarm or other suitable indication if the amount of the ingredient to be delivered when added to the amount of material already in hopper 38 exceeds the hopper or scale capacity. Module 125, as shown in FIG. 2, comprises a summing junction 230 and an operational amplifier 232. A voltage signal $E_6$ developed on the arm 234 of a potentiometer 236 is coupled through a summing resistor 237 to junction 230. A conductor 238 connected between terminals in modules 124 and 125 applies voltage signal $E_2$ through a summing resistor 239 to junction 230. Similarly, a conductor 240 which may be connected directly to conductor 143 couples voltage signal $E_3$ through a summing resistor 241 to junction 230. Junction 230 is connected to an input terminal of amplifier 232 which may be of the same form as amplifier 152. Operating power for amplifier 232 is derived from source 201. A feedback loop containing a 10 volt zenor diode 242 is connected between junction 230 and the output terminal of amplifier 232 Amplifier 232, diode 242, resistors 237, 239, and 241, and junction 230 constitute a voltage comparator network of the same form as the comparator circuits in module 121.

An alarm relay MBE-S has its coil terminals respectively connected to a 10 volt source and the output terminal of amplifier 232. The resistor of potentiometer 236 is connected across a suitable source of D. C. voltage and arm 234 is adjusted to develop a positive voltage level representative of the maximum weight of material that the scale can handle.

Since auto-tare module 124 intermittently tracks the transducer output voltage signal, signal $E_2$ which is negative, represents the amount of material already in hopper 38 after contacts TR-C1 have been closed and then opened following the delivery of the last ingredient. The weight selection voltage signal ($E_3$) for the next ingredient to be delivered will be impressed on junction 230 when stepper arm 184 is advanced to the next contact. Since signal $E_3$ is also negative, the algebraic summation of signals $E_2$ and $E_3$ will provide a negative signal representing the amount of material which will be in hopper 38 if the next ingredient is added. If the summation of signals $E_2$ and $E_3$ is less that the positive value of voltage signal $E_6$, diode 242 is forward biased to develop a voltage drop for energizing relay MBD-S.

If the summation of voltage signals $E_2$ and $E_3$ is greater than voltage signal $E_6$ indicating that the capacity of the scale will be exceeded when the ingredient represented by voltage signal $E_3$ is delivered, the resulting algebraic summation of signals $E_2$, $E_3$, and $E_6$ becomes negative with the result that diode 242 becomes reverse biased to de-energize relay MBE-S. De-energization of relay MBE-S closes a set of normally closed contacts MBE-S1 to operate an alarm 244, alerting the operator to the fact that he has an impossible batch. Alarm 244 may be connected across any suitable voltage source such as source 102.

In addition to the dribble feed and final cutoff control provided by module 121, module 122 may be added to indicate whether the amount of each ingredient delivered to hopper 38 is overweight, underweight, or within an acceptable, pre-set range. The circuitry and logic of module 122 is the same as that of module 121 except that the latter has a potentiometer 250 in place of the sequencing shift register 164. Like reference numerals suffixed by the letter *a* have therefore been applied to designate corresponding elements in module 122.

The underweight limit and the overweight limit of an acceptable weight range are set by adjusting potentiometers 148a and 250 respectively.

The connections of module 122 to conductors 139, 142, and 143 is the same as that described for module 121. Voltage signals $E_1$, $E_2$, an$E_3$ will therefore be applied through their associated summing resistors to junctions 140a and 160a. In addition to these signals, a voltage signal $E_7$ is impressed on potentiometer arm 146a which is connected through resistor 151a to junction 140a. The algebraic summation of signals $E_1$, $E_2$, $E_3$, and $E_7$ will thus control the voltage at the output terminal 158a of amplifier 152a.

If, for example, an underweight equivalent to 1 volt is acceptable, potentiometer arm 146a is set to a position where signal $E_7$ equals +1 volt. Considering the previous example in which the residue weight was selected as 1 volt and the weight of delivered material was 8 volts, the voltage signal $E_1$ will equal +9 volts. Before contacts TR-C1 are closed to track this increased transducer output voltage level, signal $E_2$ is −1 volt, thus providing a change in signal $E_1$ ($\Delta E_1$) which is equal to +8 volts as a result of completing the delivery of the first ingredient to hopper 38. The weight selection voltage $E_3$ at this stage will still equal −8 volts because stepper arm 184 has not, as yet, bee advanced from the first contact to the second contact in bank 177. Therefore, the algebraic s summation of signals $E_1$, $E_2$, $E_3$, and $E_7$ will be +1 volt. If the draft of the first ingredient is overweight, by any amount, this algebraic summation remains positive. If the draft of the first ingredient is underweight by the permissible amount of 1 volt, the algebraic summation of voltage signals $E_1$, $E_2$, $E_3$, and $E_7$ will be 0 volts. Therefore the underweight condition will be satisfied if this algebraic summation does not go negative. If, for example, the draft of the first ingredient weights less than the amount equivalent to 7 volts, the algebraic summation of signals $E_1$, $E_2$, $E_3$, and $E_7$ goes negative to indicate an underweight condition.

When the algebraic summation of signals $E_1$, $E_2$, $E_3$, and $E_7$ is positive or 0, indicating that the weight of the delivered material is not underweight, diode 153a is forward biased to cause a voltage drop across relay UEP-S. As a result, relay UEP-S will be energized to operate contacts in circuit 156 for indicating a satisfactory condition. The operation of circuit 156 will be described later on.

If an insufficient amount of material is delivered to hopper 38 to cause the algebraic summation of signals $E_1$, $E_2$, $E_3$, and $E_7$ to go negative, diode 153a will be reverse biased to hold +10 volts at junction 158a. Relay UEP-S will therefore be de-energized and the resulting inactive condition will indicate an unsatisfactory underweight condition.

As shown in FIG. 2B, potentiometer 250 is connected across a suitable source of D. C. voltage and has an adjustable wiper arm 254. Arm 254 is connected to junction 160a and is adjusted to a position for determining the upper limit of the acceptable weight range. The voltage $E_8$ impressed on arm 254 will be some negative value which is equivalent to the maximum tolerable amount of material in excess of the pre-selected amount developed by circuit 107.

For example, an excess amounting to 1 volt may be selected as being acceptable. The voltage signal $E_8$ will therefore be −1 volt. Operation of the overweight voltage comparison network of module 122 will now be explained using the previous example in which voltage signal $E_3$ was selected as −8 volts and voltage signal $E_1$ was as −1 volt owing to the presence of residue prior to delivery of the first ingredient. Voltage signal $E_2$, developed by the track and hold operation of module 124, will be −1 volt and will remain constant during delivery of the first ingredient to hopper 38.

If the weight of the first ingredient delivered to hopper 38 equals the pre-selected amount, the change in voltage signal $E_1$ will equal 8 volts so that $E_1$ will equal +9 volts which when algebraically summed up with signals $E_2$, $E_3$, and $E_8$ equals a value of −1 volt. Thus for any amount of delivered material which is equal or less than the selected amount ($E_3$), the algebraic summation of signals $E_1$, $E_2$, $E_3$, and $E_8$ will be negative.

If the weight of delivered material is overweight by 1 volt, the algebraic summation of signals $E_1$, $E_2$, $E_3$, and $E_8$ will be zero. Therefore, for all weights of delivered material which are not overweight by the selected amount of 1 volt, algebraic summation of these signals will not go positive. Under these conditions diode 163a will be reverse biased and relay OEP-S will be de-energized.

If, on the other hand, the amount of material delivered to hopper 38 exceeds the overweight limit of the acceptable weight range, say by 1 volt, voltage signal $E_1$ will become +11 volts which when algebraically summed with voltage signals $E_2$, $E_3$, and $E_8$ results in a positive value. This change in polarity across diode 163a results i the energization of relay OEP-S in a manner similar to the operation described for relay VEP-S. Energization of relay OEP-S operates relay contacts i circuit 156 to indicate an overweight condition. This sequencing circuit operation will be described later.

Still referring to FIG. 2B, module 123 provides a readout signal for an over-under meter 259 of conventional form. This module comprises a summing junction 260 which is connected to the inverting input terminal of an operational amplifier 262. Conductors 139, 142, and 143 are separately connected through summing resistors 263 to junction 260. Meter 259 is connected through an adjustable resistor 261 to a junction 265 at the output of amplifier 262. A feedback loop containing a resistor 267 is connected between junctions 260 and 265. The other input channel of amplifier 262 is clamped to ground as shown. Operating voltage for amplifier 262 is derived from source 102. Module 123 thus constitutes a voltage comparison circuit for signals $E_1$, $E_2$, and $E_3$.

After each ingredient is delivered to hopper 38 and before contacts TR-C1 are closed to track the increased transducer output signal $E_1$, the algebraic summation of voltage signals $E_1$, $E_2$, and $E_3$ represents any deviation of the delivered weight from the selected weight and also the direction (i.e., either in an underweight or overweight direction) in which the variation occurs. If the delivered weight is less than the selected weight, the voltage at junction 265 will be positive, but if the delivered weight is greater than the selected weight, the voltage at junction 265 goes negative. Meter 259 may be of any suitable, conventional form which responds to such a signal variation.

The weight controller circuit just described offers significant advantages which will now be considered in detail.

First, it is extremely compact and can be manufactured at comparatively low cost. The particular interrelated arrangement of the logic card modules 120–127 and their printed circuits significantly minimize the amount of hand wiring required as is evident from FIGS. 2A and 2B. Costs and mistakes, consequently, are correspondingly reduced.

Second, the modularized weight controller circuit of this invention is exceptionally versatile in that the refinements including the auto-tare, maximum batch size control, partial batch size control, dribble feed control, and overweight and underweight checking can each be added to or removed from the circuit to form a new system without affecting the overall performance of the system and without requiring any significant changes in the basic circuitry. The versatility of the circuit in this respect is attributable to the unique manner in which the circuit is built up with logic card modules from a basic or skeleton form and in which the logic card modules 120–127 are arranged and related to each other and to the non-modularized portions of the circuit. Also contributing to the versatility of the controller circuit is the fact that in the complete circuit, containing all the refinements and optional features which were previously described, there is only one set of control and sequencing circuit contacts (contacts TR-C1) between the input and output interfaces of circuit 106. The input interface of circuit 106 is defined essentially by the connection of junction 104 to transducer 100 the connection of module 126 to circuit 107. The output interface of circuit 106 is defined by the dual outputs of modules 121 and 122 to control operation of relays DEP-S, EP-S, UEP-S, and OEP-S and the outputs of modules 123 and 125 to control operation of relays MBE-S and meter 259. Examples of the changes that can be made will now be considered.

The logic card 134 containing the overweight and underweight dual comparator module 122 may be removed from or added to circuit 106 simply by unplugging the card or plugging it into motherboard 135. No changes in the remaining circuitry are required, and the addition or removal of module 122 does not affect the functions performed by the remaining circuitry and modules. The same applies individually to modules 123 and 125.

If both dribble feed and automatic cutoff are not desired, the logic card module 121 is simply unplugged from the motherboard. If automatic cutoff is desired, but dribble feed is not, a logic card containing a modified module 270 (see FIG. 4) may be plugged into the motherboard in place of module 121.

As shown in FIG. 4, module 270 is the same as module 121 except that the voltage comparison circuit comprising resistors 144, 145, 141, and 151, junctions 140 and 158, diode 153, and amplifier 152 have been eliminated. Accordingly like reference characters have been applied to designate like components of the remaining circuitry, namely, junction 160, its associated summing resistors, amplifier 162, and diode 163. Operation of relay EP-S is still maintained under the control of amplifier 162 and diode 163.

With module 270 plugged into the motherboard in place of module 121, operation of the system will remain the same except that the material in each draft will be delivered to hopper 38 at one feed rate instead of two.

Of course, if compensation is not desired, it is only necessary to electrically disconnect arm 184a from junction 160.

It is important to observe that the transducer scale output signal $E_1$ and the weight selection signal $E_3$ are applied to separate input terminals in control circuit 106. From the scale input terminal, voltage signal $E_1$ is delivered along separate current paths to separate motherboard terminal connection sockets schematically indicated at 280 in FIG. 2B. There will be one such terminal socket for each of the summing junctions 140, 160, 140a, 160a, and 260.

Similarly, from the weight selection input terminal, signal $E_3$ is delivered along the separate current paths to separate motherboard terminal connection sockets schematically indicated at 281. And there will likewise be one such terminal connection for each summing junction in each output module.

The output terminal of the auto-tare module 124 is also separately connected to motherboard terminal socket connections indicated at 282 to deliver signal $E_2$ along separate current paths to each summing junction in each of the output modules.

Terminals 284, 285, 286, 157, 159, 161, 284a, 285a, 286a, 157a, 159a, and 161a are male plugs, and the sets of these male plugs, which are respectively connected to junctions 140, 160, 140a, and 160a, are each adapted to be plugged into a separate set of sockets 280–282 as shown. The male input terminals which are connected through resistors 263 to junction 260 in module 123 are respectively indicated 284b, 285b, and 286a are played into a separate set of sockets 280–282 on the motherboard. Similar plug and socket arrangements indicted at 287 are provided for connecting relays DEP-S, EP-S, UEP-S, and OEP-S and meter 259 to their respective modules. Plug and socket connections are also provided for the other connections to modules 120, 124, 125, 126, and 127 to provide the current paths shown in FIG. 2A. Ground voltage source, and other connections are similarly effected by separate male and socket connections. This unique arrangement is thus one of the factors contributing to the versatility of the system.

The partial batch control provided by potentiometer 198 can readily be omitted from or left out of circuit 106 simply by electrically disconnecting resistor 196 from the output of module 126, by unplugging module 127 and by connecting a jumper 272 (see FIG. 5) from the output of amplifier 190 directly to conductor 143. Removal of potentiometer 198 from circuit 106 eliminates the need for the voltage follower module 127.

If it is desired to utilize an accumulative weight selection device in place of the non-accumulative weight selection circuit 107, it is necessary to eliminate voltage signal $E_2$, for voltage signal $E_3$ will accumulatively represent the desired weights of ingredients to be delivered.

If, for example, the selected weight of a first ingredient is the equivalent of 8 volts and the selected weight of a second ingredient is the equivalent of 6 volts, the magnitude of voltage signal $E_3$ will be 8 volts when delivery of the first ingredient is initiated and will increase to 14 volts after the delivery of the first ingredient is completed and when delivery of the second ingredient is started. The transducer voltage signal $E_1$ will be 0 (assuming no residue) before delivery of the first ingredient is initiated and will increase to essentially 8 volts after delivery of the first ingredient is completed and before delivery of the second ingredient is initiated. Since signals $E_1$ and $E_3$ are opposite in sign, a deviation of −6 volts (8 volts minus 14 volts) will be impressed on module 121 and is the equivalent of the selected amount of the second ingredient, the level of signal $E_1$ increases to 14 volts to reduce the deviation to zero. This, it will be appreciated, is a simplified example omitting the application of the dribble feed and compensation voltage signals.

When employing an accumulative weight selection device, the necessary elimination of voltage signal $E_2$ is achieved simply by unplugging the logic card containing module 124 from the motherboard. The performance of the remaining circuitry is not affected except for the function of module 125. The maximum batch size control afforded by module 125, however, is not required, for the summation of the selected weights of all the ingredients is directly obtainable from the accumulative setting of the weights on an accumulative type weight selection device.

The foregoing, it will be appreciated that circuit 106 can readily be built up from a skeleton network mainly comprising some form of transducer signal conditioning equipment, such as amplifier 108, preferably a filter, such as module 120, and a voltage follower, such as module 126 if the weight selection device has a high input impedance. The outputs of modules 120 and 126 are then wired into the motherboard to provide the previously described separate current paths extending form the output of each of the modules 120 and 126 to each summing junction as well as the wiring to provide the separate current paths for signals $E_3$ to facilitate the optional use of the auto-tare module 124. With essentially this basic circuitry, the variety of previously described functions may optionally be performed.

It also is important to observe that circuit 106 is not necessarily limited in application to weighing systems. In this connection, transducer 100 may be employed to sense other measurable conditions such as temperature. Weight selection circuit then will be employed in a broader function, namely, that of setting up one or more control or cutoff points which may be used, for example, for controlling the sensed temperature condition mentioned above.

Another important aspect of this invention resides in the use of a common voltage source for all of the components which provide the previously described voltage signals $E_1$–$E_8$. In particular, it is to be noted that all of the equipment in circuit 106 is powered by source 102. Source 102 also provides the current for transducer 100, and potentiometers 170 and 170a. As a result of this circuit arrangement, the comparisons of the various voltage signal combinations previously described are not materially affected by a drift in the power supply voltage.

Heretofore, it was the practice to employ power supply circuits which have a very stiff or stable characteristic to minimize errors resulting from drifting as caused, for example, by variations in the incoming line voltage and/or variations in temperature. This invention eliminates the need for such relatively stable power supply circuits by providing a control circuit which is capable of utilizing a common power supply source. This is particularly important to achieve improved weighing accuracy. Because of the common source 102, a power supply drift does not affect the relative values of signals $E_1$, $E_2$, $E_3$, $E_4$, $E_5$, $E_6$, and $E_7$.

SEQUENCING AND SWITCHING CIRCUIT AND OPERATION

Referring now to FIG. 6, circuit 156 is shown in stand-by de-energized condition and comprises pair of conductors 300 and 301 across which a suitable source of D.C. voltage is coupled. To start the automatic operation of the weighing system, a spring-loaded, push-button start switch 304 is depressed to energize a start relay S-R. This circuit may be traced from conductor 300 through closed contacts of a discharge gate limit switch 306 through the closed contacts of switch 304, and through the winding of relay S-R to conductor 301.

Switch 306 will be closed when discharge gate 66 is closed and will be open when gate 66 is open. Thus, if switch 306 is open indicating the gate 66 is open, relay S-R cannot be energized.

Still referring to FIG. 6, energization of relay S-R closes two sets of normally open contacts S-R1 and S-

R2. Closing of contacts S-R1 establishes a holding circuit around switch 304 to maintain relay S-R energized as long as discharge date limit switch 306 remains closed. Closing of contacts S-R2 completes circuits for energizing a relay TR-C and a slow pull-in delay feed timer DF-T The circuit for energizing time DF-T may be traced from conductor 300, through contacts-R2, through a set of normally closed contacts R-T1 of a slow drop-out re-set timer R-T1 and through the operating winding of timer DF-T to conductor 301. The circuit for energizing relay TR-C may be traced from conductor 300, through contacts S-R2, through contacts R-T1, through set of normally closed contact DF-T1 of timer DF-T, and through the energizing winding of relay TR-C to conductor 301.

By closing contacts TR-C1 (see FIG. 2A), the amplified and filtered transducer output voltage signal $E_1$ will be coupled to module 124 to charge capacitor 210 to the value of signal $E_1$ in the manner previously described. At this stage, no material has been fed to hopper 38. In absence of any residue in the hopper, therefore, the magnitude of voltage signal $E_1$ be 0, provided that potentiometer 112 has been properly adjusted to tare the weighing apparatus components acting on transducer 100. If, on the other hand, there is residue in hopper 38, voltage signal $E_1$ will have a finite magnitude representative of the weight of that residue. This voltage signal, which is steady owing to the non-variation of the load in the hopper, will be stored and thus memorized by capacitor 210.

After a short pre-determined period following energization of timer DF-T and relay TR-C and permitting capacitor 210 to be charged up to the value of voltages signal $E_1$, timer DF-T times out to open contacts DF-T1, thereby de-energizing relay TR-C to cause contacts TR-C1 to open. The stored value of the voltage signal on capacitor 210 will thus be proportional to the weight of any material in hopper 38 before any material is delivered during the batch weighing operation. By timing out after a preselected delay, timer DF-T closes a set of contacts DF-T2 to complete a circuit for energizing a full flow motor starter relay 1FF and a dribble feed motor starter relay 1DF if switch 182 has been stepped to its first position where the contact arm 184 engages the first contact in bank 177.

In addition to the switch deck provided by arm 184 and its associated contact bank (FIG. 2A), switch 182 is provided with two further switch decks 310 and 312 (FIG. 6). Deck 310 comprises a movable contact arm 314 which is connected to a bus 316 and which is stepped to successively engage a series of electrically independent contacts in a bank 318. The number of contacts in bank 318 preferably is the same as the number of contacts in the bank associated with arm 184.

Still referring to FIG. 6, deck 312 also has a movable contact arm 320 which is connected to a bus 322 and which is stepped to successively engage a series of electrically independent contacts in a bank 324. The number of contacts in bank 324 is the same as the number of contacts in bank 318. Both contact arms 314 and 320 as well as arms 184 and 184a are coupled for unitary movement by a suitable linkage schematically indicated at 326.

As shown in FIG. 6, switch 182 comprises a conventional stepper switch network 329 which includes the usual operating stepper coil SS-C and which also may include such circuit elements as a rectifier, arc suppresser, and filter. Coil SS-C is connected across conductors 300 and 301 in a manner to be described more fully later on.

By energizing coil SS-C, contact arms 184, 184a, 314, and 320 are respectively advanced in synchronism through the contact positions shown in the drawings. A number of contact positions shown in the contact banks for switch 182 are illustrated as open circuits for use if more than two materials are desired to be fed to weight hopper 38 in a single weighing cycle.

The energizing circuit for relay 1FF may be traced through contacts S-R2, through contacts R-T1, through contacts DF-T2, through a set of normally closed contacts DEP-S1 of relay DEP-S, through contact arm 320 to the contact at the first position in bank 326, and through the winding of relay 1FF to conductor 301. Similarly, the energizing circuit for relay 1DF may be traced through contacts S-R2, R-T1, and DF-T2, through a set of normally closed contacts EP-S1 of relay EP-S, through contact arm 314 to the contact at the first position in bank 318, and through the winding of relay 1DF-MS to conductor 301.

By energizing relay 1FF, normally open contacts 1FF-1 1FF-2, and 1FF-3 are, as shown in FIG. 7, closed to complete a power circuit for energizing motor 32. Energization of relay 1FF also closes a set of normally open contacts 1FF-4 to energize solenoid 76. Energization of solenoid 76 opens catch gate 73 at the same time that motor 32 is started. Similarly, energization of relay 1DF closes normally open contacts 1DF-1, 1DF-2, and 1DF-3 to complete a power circuit for energizing motor 48. Energization of relay 1DF also closes a further set of normally open contacts 1DF-4 to energize solenoid 80. Energization of solenoid 80 opens catch gate 77 concomitantly with the energization of motor 48.

As a result of starting motors 32 and 48, feeders 24 and 40 are actuated to begin delivery of the first material to weigh hopper 38. Transducer 100 senses this weight addition to develop voltage signal $E_1$ which is compared with voltage signals $E_2$, $E_3$, and $E_4$ in the manner previously described. As feeders 24 and 40 continue to deliver material to weight hopper 38, voltage $E_1$ increases to approach a balanced signal condition which is set by potentiometer 148 as previously explained.

When this balanced signal condition occurs, the voltage signal at junction 158 decreases to 0 to cause energization of relay DEP-S. Energization of relay DEP-S opens contacts DEP-S1 to interrupt the energizing circuit for relay 1FF. Consequently, relay 1FF de-energizes to open contacts 1FF-1, 1FF-2, 1FF-3, and 1FF-4. As a result, motor 32 will de-energize to stop feeder 4 and catch gate 73 will be moved to its flow-interrupting closed position.

Material now continues to flow into weight hopper 38 but only at the reduced dribble feed rate from feeder 40. When the final cutoff point set by potentiometer arm 174a is reached, the voltage signal at the output of amplifier 162 reduces to zero for energizing relay EP-S in the manner previously described. Energization of relay EP-S opens contacts EP-S1 to interrupt the energizing circuit for relay 1DF. De-energization of relay 1DF opens contacts 1DF-1, 1DF-2, 1DF-3, 1DF-4. Consequently, motor 8 will de-energize to stop feeder 40 and catch gate 77 will be moved to its closed, flow-interrupting position. The delivery of the first material is therefore discontinued and the sequencing and control circuit 156 will then operate to prepare for and start the delivery of the second material.

With continued reference to FIG. 6, relay EP-S is provided with a pair of normally open contacts EP-S2 which close when relay EP-S energizes, signifying the completion of delivery of the first material, to complete an energizing circuit for a show pull-in scale stabilization timer DS-T. This circuit may be traced from conductor 300, through contacts S-R2, T-T1, DF-T2, and EP-S2 and through the operating winding of timer DS-T to conductor 301.

After a pre-selected time period sufficient to permit the scale to stabilize, timer DS-T times out close contacts DS-T1 for completing a circuit form conductor 300 to a terminal 330 of an overweight and underweight checking network 332. Network 332 comprises a set of normally closed contacts OEP-S1 and a set of normally open contacts OEP-S2 of relay OEP-S, as well as a set of normally closed contacts UEP-S1 and a set of normally open contacts UEP-S2 of relay UEP-S. In addition, network 332 includes an off-weight alarm timer OWA-T.

As shown in FIG. 6, contacts OEP-S1 and UEP-S1 are connected in series in a branch circuit having one terminal connected to terminal 330 and the other terminal connected to a terminal of the operating winding for timer OWA-T. Contacts OEP-S2 and UEP-S2 also are connected in series in a separate branch circuit which is in parallel with the branch circuit containing contacts OEP-S1 and UEP-S1.

When contacts DS-T1 close after the first material is received in hopper 38 and the scale is permitted to stabilize, one of three conditions can exist: first, the weight of the first material received in hopper 38 is within the acceptable overweight and underweight limits set by potentiometers 250 and 148a; second the weight of the first material received in hopper 38 is less than the underweight limit of the acceptable weight range as set by potentiometer 148a; and third, the weight of the first material fed to hopper 38 exceeds the overweight limit of the acceptable weight range as set by potentiometer 250.

If the weight of the first material received in hopper 38 is within the acceptable weight range relay UEP-S will be energized and relay OEP-S will remain de-energized as previously explained. Consequently, contacts OEP-S1 and UEP-S2 will be closed, but contacts UEP-S1 and OEP-S2 will be open to prevent a circuit from being completed to energize timer OWA-T.

If, on the other hand the weight of the first material delivered to hopper 38 is less than the underweight limit of the acceptable range, both relays UEP-S and OEP-S will be de-energized. As a result, contacts OEP-S1 and UEP-S1 will be closed to complete a circuit form terminal 330 to energize timer OWA-T.

If the weight of the first material delivered to hopper 38 exceed the overweight limit of the acceptable range, both relays UEP-S and OEP-S will be energized. Under these conditions, contacts OEP-S2 and UEP-S2 will be closed to complete a circuit form terminal 330 to energize the timer OWA-T.

Following a pre-determined time delay after a circuit is completed for timer OWA-T signifying that the weight of the material is either overweight or underweight, the timer times out to close a set of contacts OWA-T1 (FIG. 6) to complete a circuit for illuminating an off-weight lamp 332.

Still referring to FIG. 6, relay OEP-S is provided with a set of normally closed contacts OEP-S3 and relay UEP-S is provided with a set of normally open contacts UEP-S3 to control energization of stepper coil SS-C. If the weight of the first material delivered to weight hopper 38 is within the acceptable weight range, contacts OEP-S3 will remain closed since relay OEP-S is de-energized and contacts UEP-S3 close owing to the energization of relay UEP-S. With contacts OEP-S3 and UEP-S3 both closed, a circuit is completed for energizing stepper coil SS-C. This circuit may be traced from conductor 300 through contacts DS-T1 to terminal 330, from terminal 330 through contacts OEP-S3 and contacts UEP-S3, which are connected series, through a set of normally closed contacts K-T2 of timer R-T, and through coil SS-C to conductor 301. When energized, stepper coil SS-C closes a set of stepper switch interrupter contacts 340. By closing contacts 340, a circuit is completed for energizing timer R-T. This circuit may be traced from conductor 300 through contacts 340 and through the operating winding for timer R-T to conductor 301.

Energization of timer R-T immediately opens contacts R-T2 to interrupt the energizing circuit for stepper coil SS-C. When stepper coil SS-C is energized, the stepping mechanism of switch 182 is cocked, and when coil SS-C de-energizes by opening contacts R-T2, the cocked stepper mechanism then advances contact arms 314, 320, 184, and 184a to the next contact in their respective banks of contacts.

In the event that the weight of the first material delivered to hopper 38 is not within the acceptable range, a circuit will not be completed to energize stepper coil SS-C since either contacts OEP-S3 or contacts UEP-S3 will be open. Thus, when the weight of a delivered ingredient is not within the acceptable weight range automatic operation of the weighing system will stop, requiring the load received in hopper 38 to manually be discharged and requiring the control circuitry to be re-set in a manner to be described later on.

When contact arms 314 and 320 are advanced to their 02 positions in banks 318 and 324 respectively, no circuit, as yet, will be completed for energizing relays 2DF and 2FF since energization of timer R-T immediately opens contacts T1. Opening of contacts R-T1 also interrupts the energizing circuits for timers DF-T and DS-T.

When stepper coil C is de-energized, contacts 340 open to interrupt the energizing circuit for timer R-T. As a result, timer R-T now starts to time out allowing timers DF-T and DS-T to re-set their respective contacts. When timer R-T finally times out, timer DF-T and relay C will again energized by the closure of contacts R-T1.

Capacitor 210 will now be charged to the increased value of the transducer output signal $E_1$ at this stage, is steady because no material is being delivered to or removed from weigh hopper 38. When timer DF-T times out, contacts DF-T1 open to de-energize relay TR-C. Contacts TR-C1 thereby open and the increase voltage signal stored on capacitor 210 is applied to modules 121, 122, 123, and 125 in the form of voltage signal $E_3$ in the manner previously described. The algebraic summation of voltage signals $E_1$ and $E_3$ at junctions 140, 160, 140a, and 160a will consequently become 0. Since contact arm 184 has now been advanced to its second position for developing the voltage corresponding to the desired weight of the second material to be delivered to weight hopper 38, in unbalanced voltage signal condition will be impressed upon comparators 152, 162,52a, and 162a. As a result, relays EP-S, DEP-S, UEP-S, and OEP-S will all de-energize to re-set their associated contacts.

When contacts DEP-S1 close as a result of de-energizing at its No. 2 position where it engages the second contact in bank 324 to energize relay 2FF for starting motor 32a. This energizing circuit may be traced from conductor 300, through contacts S-R2, through contacts R-T1 (which are now closed as a result of relay R-T timing out), through contacts DF-T2 (which are now closed as a result of relay DF-T timing out), through contacts DEP-S1 (which are now closed as a result of de-energizing relay DEP-S), through contact arm 320 and through the winding of relay 2FF to conductor 310.

Concomitantly with the energization of relay 2FF, a circuit will be completed for energizing relay 2DF for starting motor 48a. This circuit may be traced from conductor 300 through contacts S-R2, R-T1, and DF-T2, through contacts EP-S1 (which are now closed as a result of de-energizing relay EP-S), through contact arm 314, and through the winding of relay 2DF to conductor 301.

As shown in FIG. 7, energization of relay 2FF closes normally open contacts 2FF-1, 2FF-2, and 2FF-3 to start motor 32a. When relay 2FF is energized, a further set of normally open contacts 2FF-4 are also closed to complete a circuit for energizing solenoid 76a.

Energization of relay 2DF closes normally open contacts 2DF-1, 2DF-2, 2DF-3, and 2DF-4 for energizing motor 48a and solenoid 80a.

By energizing motors 32a and 48a and by energizing solenoids 76a and 80a, it is clear that feeders 60 and 62 will be started and that catch gates 73a and 77a will be opened, thus providing for the delivery of the second material to weigh hopper 38. The second material will thus be fed at a full flow rate to weigh hopper 38, and the transducer output voltage signal $E_1$ will thus increase until a balanced signal condition is obtained at comparator 152. The signal output of comparator 152 will then energize relay DEP-S as previously explained. Energization of this relay opens contacts DEP-S1 to interrupt the energizing circuit for relay 2FF. De-energization of relay 2FF opens contacts 2FF-1, 2FF-2, 2FF-3, and 2FF-4 to de-energize motor 32a and also to de-energize solenoid 76a. Consequently, feeder 60 will stop and gate 73a will be swung to its flow-interrupting, closed position. The second material will now be fed to hopper 38 at a reduced, dribble feed rate by feeder 62, thereby causing the transducer output voltage signal to continue to increase. When the final cutoff point is reached, as determined by the setting of potentiometer arm 175a, the balanced voltage signal condition biases diode 163 forwardly to re-energize relay EP-S.

Energization of relay EP-S opens contacts EP-S1 to interrupt the energizing circuit for relay 2DF. De-energization of relay 2DF opens contacts 2DF-1, 2DF-2, 2DF-3, and 2DF-4 to de-energize motor 48a and also to de-energize solenoid 80a. As a result, catch gate 77a will close and feeder 62 will stop to discontinue the delivery of the second material to hopper 38.

Contacts EP-S2 which are closed by re-energizing relay EP-S completes a circuit for again energizing timer DS-T for allowing the scale to stabilize before checking the weight of the second material with network 332. Once timer DS-T times out, network 332 becomes operative in the previously described manner to check if the weight of the second material delivered to hopper 38 is within the acceptable tolerance established by the settings of potentiometers 148 and 250.

If the weight of the second material is within the acceptable tolerance, a circuit will be completed through contacts OEP-S3 and UEP-S3 to energize stepper coil SS-C in the manner already explained. This closes the stepper switch interrupter contacts 340 to energize timer R-T which immediately de-energizes coil SS-C to advance contact arms 314, 320, 184, and 184a to the third contact position in their respective contact banks. In addition, timers DF-T and DS-T are re-set to the deenergized state.

Timer R-T now times out again to energize timer DF-T and also relay TR-C as previously explained. When timer DF-T times out, contacts DF-T1 open to de-energize relay TRC and contacts DF-T2 close completing a circuit up to the third contact in each of the banks 318 and 324. However, no circuit will be completed through these contact arms since there are no motor-starter relays connected to the third contact positions in banks 318 and 324.

At this stage, a circuit will be completed through a further contact arm 350 (see FIG. 6) to energize a home-stepper relay HS-R. Contact arm 350 is contained in a further deck 352 forming a part of switch 182 and comprising a bus 354 and a series of electrically independent contacts in a bank 356. Contact arm 350 is connected to bus 354 and is advanceable to successively engage the contacts in bank 356. The number of contacts in bank 356 is the same as the number of contacts in the previously described contact banks of switch 182. Contact arm 350 is ganged to arms 314, 320, 184, and 184a to move in synchronism therewith. In deck 352, the contact positions 1,2, and 4–10 are open circuits, and positions 3 and 11 are connected to provide a homing circuit as will now be described.

Since the first and second positions in bank 356 are open circuits, no circuit will be completed through contact arm 350 during the delivery of the first and second materials. However, when the delivery of the second material to weigh hopper 38 is completed, and when contact arm 350 is advanced to its third position in bank 356 along with the advancement of the other stepper switch contact arms, a circuit will be completed for energizing relay HS-R. This energizing circuit may be traced from conductor 300 through contacts S-R2 and ReT1, through arm 350 to the third contact in bank 356, and through the winding of relay HS-R to conductor 301.

When relay HS-R is energized, it closes a normally open set of contacts HS-R1 which establishes a holding circuit. This holding circuit may be traced from a conductor 301 through the winding of relay HS-R, through contacts HS-R1, and through a set of normally closed stepper switch contacts SS-C1 which are operated by the stepper network 329. Thus, relay HS-R can only be de-energized by opening contacts SS-C1. As will become apparent, contacts SS-C1 will openly when contact arm 350 is to the last contact positioning bank 356.

Energization of relay HS-R closes a second set of normally open contacts HS-R2 to complete a new energizing circuit for stepper coil SS-C. This circuit may be traced from conductor 300, through contacts SS-C1, through a further set of normally closed interrupter stepper switch contacts SS-C2, through contacts HS-R2, and through coil SS-C to conductor 301.

Energization of coil SS-C opens contacts SS-C2 to de-energize the stepper coil for advancing contact arms 314, 320, 350, 84, and 184a to the fourth contact position in the irrespective contact banks. Relay HS-R will remain energized through contacts SS-C1. When coil SS-C de-energizes, contacts SS-C2 close to re-energize coil SS-C. The contact arms 314, 320, 350, 184, and 184a will now be stepped in this self-interrupting fashion until contact arm 350 engages the last contact in bank 356.

When contact arm 350 engages the last contact in bank 356, contacts SS-C1 will open to interrupt the relay holding circuit through contacts HS-R1, causing relay HS-R to de-energize and thereby holding contact arms 314, 320, 350, 184, and 184a at the last contact positions in their respective contact banks.

When contact arm 350 engages the last contact in bank 356 and when contacts R-T1 close, a circuit is completed for energizing a discharge relay D-R. This circuit may be traced from conductor 300, through contacts S-R2 and R-T1, through arm 350 to the eleventh or last contact in bank 356, and through the winding of relay D-R to conductor 301. Energization of relay D-R closes set of normally open contacts D-R1 to complete an energizing circuit for a slow drop-out discharge timer D-T. The operating winding of timer D-T is connected in series with contacts D-R1 across conductors 300 and 301.

By operating timer D-T, a set of contacts D-T1 are closed to complete a circuit for energizing solenoid 72 which opens discharge gate 66 to discharge the material delivered to hopper 38. Operation of timer D-T instantaneously closes a set of normally open contacts D-T2 to complete another energizing circuit for stepper coil SS-C. This circuit may be traced from conductor 300, through contacts D-T2, through contacts R-T2, and through stepper coil C to conductor 301.

As a result of energizing coil SS-QC, contacts 340 will close to complete an energizing circuit for timer R-T. In this time, discharge gate 66 will be opening and will activate limit switch 306 to its open position, with the result that relay S-R will be de-energized. By de-energizing relay R, contacts S-R1 and S-R2 will open to de-activate the part of the control circuit controlled through contacts S-R2. As a result of energizing relay R-T, contacts R-T2 will open as previously explained to interrupt the energizing circuit for stepper coil SS-C. This causes contacts 340 to open to interrupt the energizing circuit for timer R-T which then starts to time out, thereby advancing contact arms 314, 320, 350, 184, and 184a to the first contact position in their respective contact banks. No feeding of material will occur, however, since relay S-R will have been de-energized by the time timer R-T times out.

After time D-T times out and limit switch 306 closes, indicating that discharge gate 66 is closed, the control circuit will be re-set for another feeding cycle.

When the condition of a weighing of any one of the materials delivered to hopper 38 is off-weight and consequently not within the overweight of underweight tolerance limits set by potentiometers 148a and 250, automatic operation of the weighing system will be interrupted because, as previously explained, either contacts OEP-S3 or contacts UEP-S3 will be thereby preventing a circuit from being completed for automatically energizing stepper coil SS-C to advance the contact arms of switch 182 to their next contact positions in their respective contact banks. Under such conditions, contacts OWA-T1 will be closed to illuminate lamp 332 and also to complete a circuit to one terminal of a by-pass off-weight and discharge switch 360 shown in FIG. 6. With contacts OWA-T1 closed, switch 360, which may be of the spring-loaded, push-button type, must be depressed by the operator in order to discharge the contents in hopper 38 before another weighing cycle can be initiated. By depressing switch 360, a circuit is completed for energizing a relay BW-R. This circuit may be traced from conductor 300, through contacts OWA-T1, through switch 360, and through the operating winding of relay BW-R to conductor 301.

Energization of relay BW-R closes two sets of normally open contacts BW-R1 and BW-R2. Losing of contacts BW-R1 establishes a holding circuit around switch 360 to keep relay BW-R energized when switch 360 is released. Closing of contacts BW-R2 completes an energizing circuit for operating stepper coil SS-C. Energization of coil SS-C opens contacts SS-C2 to interrupt the energizing circuit through contacts BW-R2, with the result that all of the contact arms of switch 182 will be advanced to their next contact positions in their respective contact banks. By de-energizing coil SS-C, contacts SS-C2 again close to re-energize stepper coil SS-C in the manner previously explained. Accordingly, coil SS-C will be pulsed to step the contact arms of switch 182 in this self-interrupting fashion until contact arm 350 engages the last contact in bank 356.

By engaging contact arm 350 with the last contact in bank 356, contacts SS-C1 will now open to interrupt the relay holding circuit through contacts BW-R1. As a result, relay BW-R will deenergize causing contacts BW-R1 and BW-R2 to open. This de-activates the stepper switch network 329 with all of the contact arms of control switch 182 at their last contact positions in their respective contact banks. Finally, as previously explained, the discharge cycle is started, commencing with the energization of relay D-R to discharge the contents of hopper 38 and to re-set the circuit for another weighing cycle.

As shown in FIG. 6, a further spring-loaded pushbutton set and reset switch 370 is connected in series with switch 360 between conductors 300 and 301. By simultaneously depressing switches 360 and 370, relay BW-R is energized for stepping the contact arms of switch 182 to their first contact positions in their respective contact banks. Switch 370 is used only after a power failure or during initial start-up to position the contact arms of switch 182 for a weighing cycle when no material is in hopper 38.

If module 121 is replaced with module 270, relays 1FF and 2FF may be permanently disconnected from the circuit or contacts DEP-S1 may be placed under the control of relay EP-S. If module 122 is removed, contacts UEP-S3 must be jumped and timer OWA-T may permanently be disconnected from the circuit.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A weighing system comprising a weighing receptacle, first means providing for the successive delivery of at least first and second materials to said receptacle to make up a batch of said materials in said receptacle, second means responsive to the accumulated weight of material delivered to said receptacle for producing a first signal that is representative of the accumulated weight of material delivered to said receptacle, weight selection means for developing second and third signals that are pre-set to respectively represent the desired weights of said first and second materials to be delivered to said receptacle, third means for memorizing said first signal at least after the delivery of said first material and before delivery of said second material, and fourth means responsive (a) to at least said first and second signals to control the delivery of said first material to said receptacle and (b) to at least said first signal, said third signal and said memorized signal to control the delivery of said second material to said receptacle, said weight selection means and said memorizing means being operatively connected to said fourth means independently of each other, whereby the memorized signal and each signal developed by said weight selection means are applied to said fourth means independently of each other.

2. A weighing system comprising a weighing receptacle, first means providing for the successive delivery of at least first and second materials to said receptacle to make up a batch of said materials in said receptacle, second means responsive to the accumulated weight of material delivered to said receptacle for producing a first electrical signal that is representative of the accumulated weight of material delivered to said receptacle, weight selection means for developing second and third electrical signals that are pre-set to respectively represent the desired weight of said first and second materials to be delivered to said receptacle, third means for memorizing said first signal before the delivery of said first material and after the delivery of said first material but before the delivery of said second material whereby the memorized signal represents the weight of any material in the receptacle prior to the delivery of each of said materials, and fourth means responsive (a) at least to said first signal, said second signal, and the signal that was memorized before the delivery of said first material to said receptacle to control the delivery of said first material to said receptacle and (b) to said first signal, said third signal and the signal that was memorized after the delivery of said first material to control the delivery of said second material to said receptacle, said weight selection means and said memorizing means being operatively connected to said fourth means independently of each other, whereby the memorized signal and each signal developed by said weight selection means are applied to said fourth means independently of each other.

3. A weighing system comprising a weighing receptacle, first means providing for the successive delivery of at least first and second materials to said receptacle to make up a batch of said materials in said receptacle, second means responsive to the accumulated weight of material delivered to said receptacle for producing a first electrical signal that is representative of the accumulated weight of material in said receptacle, weight selection means for developing second and third electrical signals that respectively represent the desired weights of said first and second materials to be delivered to said receptacle, third means, said weight selection means being operatively connected to said third means to successively apply said second and third signals to said third means in a correlated relation with the delivery of said first and second materials, and fourth means operatively connected to said second means independently of said third means for memorizing said first signal at least after the delivery of said first material and before delivery of said second material, said fourth means being operatively connected to said third means to apply the memorized signal to said third means during delivery of said second material, and said third means being responsive (a) to at least said first and second signals to control the delivery of said first material to said receptacle and (b) to at least said first, third and memorized signals to control the delivery of said second material to said receptacle.

4. A weighing system comprising a weighing receptacle, means providing for the successive delivery of a plurality of materials to said receptacle, means responsive to the accumulated weight of material delivered to said receptacle for developing a first voltage signal representative of the weight of material delivered to said receptacle, means memorizing said first signal each time before each of the plurality of materials is delivered for developing a second substantially constant voltage signal representative of the weight of any material already in said receptacle prior to the delivery of each of said plurality of materials, weight selection means for developing a pre-set voltage signal for representing the desired weight of each of said plurality of materials delivered to said receptacle, signal comparing means independently and concomitantly connected along separate current paths respectively to said first signal developing means, said weight selection means, and said second signal developing means for comparing said pre-set signal with the difference between the magnitudes of said first and second signals during the delivery of each of said materials, and signal utilization means controlled by said comparison.

5. The weighing system defined in claim 4, wherein said signal utilization means is responsive to said comparison for controlling the delivery of each material to said receptacle.

6. A weighing system comprising a weighing receptacle, means providing for the successive delivery of a plurality of materials to said receptacle, transducer means responsive to the accumulated weight of material delivered to said receptacle for developing a first voltage signal representative of the accumulated weight of material delivered to said receptacle, weight selection means for developing a pre-set voltage signal for representing the desired weight of each of the plurality of materials to be delivered, voltage signal memorizing means having signal input terminal means and signal output terminal means, signal responsive means, signal-transmitting means for connecting said output terminal means, said transducer means and said weight selection means to said signal responsive means, means for connecting said input terminal means to said transducer means independently of said signal responsive means during each interval between delivery of successive ones of said materials to memorize the magnitude of said first signal during each interval and for applying the memorized signal to said output terminal means for transmittal to said signal responsive means during the delivery of each material to said receptacle, and signal utilization means operatively connected to said signal responsive means, said signal responsive means being responsive to the alegbraic summation of at least said first, pre-set and memorized signals during material delivery to control said signal utilization means, with the polarities of said pre-set and memorized signal being opposite to that of said first signal.

7. The weighing system defined in claim 6, wherein said signal utilization means is operative under the control of said signal responsive means to control the delivery of each material to said receptacle.

8. A weighing system comprising a receptacle, means providing for the successive delivery of at least first and second materials to said receptacle to make up a batch of said materials in said receptacle, means for developing a first electrical signal representative of the accumulated weight of material delivered to said receptacle, means memorizing said first signal at least during the interval between delivery of said materials for developing a second substantially constant electrical signal representative of the weight of the material already in said receptacle prior to the delivery of said second material to said receptacle, weight selection means for developing a pre-set electrical signal for representing the desired weight of each material to be delivered to said receptacle, means responsive to at least said first and pre-set signals for controlling the delivery of said first material to said receptacle and to at least said first, second and pre-set signals for controlling the delivery of said second material to said receptacle, and means coacting with said pre-set signal and said second signal for providing an indication whenever the selected weight of one material to be delivered, when added to the weight of material already in said receptacle, exceeds a predetermined amount.

9. The weighing system defined in claim 8, wherein said means coacting with said second and pre-set signals comprises means for developing a third voltage signal representative of said predetermined amount, signal comparing means for comparing said third signal with the sum of said second and pre-set signals, and indicator means controlled by said comparison.

10. A weighing system comprising a weighing receptacle, means providing for the successive delivery of at least first and second materials to said receptacle to make up a batch of said materials in said receptacle, means responsive to the accumulated weight of material delivered to said receptacle for producing a first D.C. signal that is a function of the accumulated weight of material delivered to said receptacle, weight selection means for producing second and third D.C. signals that have pre-selected values to respectively represent the desired weights of said first and second materials to be delivered to said receptacle, a storage capacitor, switch means electrically connected to said capacitor and being actuatable to complete a charging circuit to store a charge on said capacitor that has an absolute value proportional to that of said first signal after the delivery of said first material and before delivery of said second material, and means responsive (a) to at least said first and second signals to control the delivery of said first material to said receptacle and (b) to at least said first signal, said third signal and the charge on said capacitor to control the delivery of said second material to said receptacle.

11. The weighing system defined in claim 10 wherein said switch means is electrically connected between said capacitor and said first signal producing means.

12. A weighing system comprising a weighing receptacle, first means providing for the successive delivery of at least first and second materials to said receptacle to make up a batch of said materials in said receptacle, second means responsive to the accumulated weight of material delivered to said receptacle for producing a first electrical signal that is representative of the accumulated weight of material delivered to said receptacle, weight selection means for developing second and third electrical signals that respectively represent the desired weights of said first and second materials to be delivered to said receptacle, third means operatively connected to said weight selection means and to said second means and being responsive (a) to the alegbraic sum of at least said first and second signals for controlling the delivery of said first material and (b) to the alegbraic sum of at least said first and third signals for controlling the delivery of said second material, and a sample and hold circuit (a) for sampling said first signal at least during the period after delivery of said first material and prior to delivery of said second material and (b) for supplying a memorization of the sampled signal to tare said first signal during delivery of said second material, said circuit having signal sampling input terminal means operatively connected to said second means independently of said third means for receiving the signal to be sampled.

13. The weighing system defined in claim 12 wherein said weight selection means and said circuit are operatively connected to said third means independently each other.

14. The weighing system defined in claim 12, wherein said sample and hold circuit further includes output terminal means operatively connected to said third means for applying the memorization of the sampled signal thereto, and capacitance means connected between said input and output terminal means for storing and thereby memorizing the sampled signal.

15. The weighing system defined in claim 14 wherein said third means comprises an operational amplifier circuit having an input summing junction, and wherein said first signal, each signal developed by said weight selection means and the memorization of the sampled signal are all applied to said summing junction, and means controlled by the output of said amplifier circuit for interrupting the delivery of each of said materials when the algebraic summation of signals at said junction reaches a predetermined level.

16. A weighing system comprising a load-receiving structure for receiving at least two successively applied loads, at least the second one of said loads following application of the first of said successively applied loads being a flowable material, means providing for the delivery of said material, means responsive to the weight of the load or loads applied to said structure for producing a first D.C. signal that is a function of the total weight of the load or loads applied to said structure, capacitor means, means actuatable to complete a charging circuit for charging said capacitor means to a value that is proportional to the value that said first signal has after said first load is applied to said structure but before delivery of said material is initiated, weight selection means for producing a second D.C. signal having a pre-selected value that is representative of the desired weight of said material to be delivered, and means responsive to at least said first signal, said second signal and said charge for controlling the delivery of said material.

17. The weighing system defined in claim 16 wherein said means controlling the delivery of said material comprises operational amplifier circuit means electrically connected to said first signal producing means, said capacitor means, and said weight selection means, wherein the charge on said capacitor and said second signal have like polarities that are opposite to the polarity of said first signal, said operational amplifier circuit means being operative to produce an output signal that is controlled by the algebraic summation of at least said first signal, said second signal and said charge during delivery of said material, and means under the control of said output signal for stopping the delivery of said material when the amount of delivered material reaches a value corresponding to said preselected value.

18. The weighing system defined in claim 16 wherein said means for completing said charging circuit comprises switch means electrically connected to said capacitor means.

19. The weighing system defined in claim 18 wherein said switch means is electrically connected between said first signal producing means and said capacitor.

* * * * *